US011976401B2

(12) United States Patent
Lee et al.

(10) Patent No.: US 11,976,401 B2
(45) Date of Patent: May 7, 2024

(54) DRAINAGE PASSAGE INCLUDING FILTER AND WASHING MACHINE HAVING THE SAME

(71) Applicant: SAMSUNG ELECTRONICS CO., LTD., Suwon-si (KR)

(72) Inventors: Kanghyun Lee, Suwon-si (KR); Byoungyull Yang, Suwon-si (KR); Youngjin Cho, Suwon-si (KR); Sanggyu Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/701,115

(22) Filed: Mar. 22, 2022

(65) Prior Publication Data

US 2022/0298695 A1 Sep. 22, 2022

Related U.S. Application Data

(63) Continuation of application No. PCT/KR2022/002675, filed on Feb. 23, 2022.

(30) Foreign Application Priority Data

Mar. 22, 2021 (KR) .......................... 10-2021-0036901

(51) Int. Cl.
*D06F 39/08* (2006.01)
*B01D 29/11* (2006.01)
(Continued)

(52) U.S. Cl.
CPC .............. *D06F 33/42* (2020.02); *B01D 29/11* (2013.01); *B01D 29/56* (2013.01); *B01D 29/605* (2013.01);
(Continued)

(58) Field of Classification Search
CPC .......... D06F 33/42; D06F 33/43; D06F 33/47; D06F 33/62; D06F 33/69; D06F 33/74;
(Continued)

(56) References Cited

U.S. PATENT DOCUMENTS 10,655,266 B2    5/2020   Rajendran et al.
2006/0130878 A1* 6/2006   Lee ..................... A47L 15/4225
                                                   134/104.4
(Continued)

FOREIGN PATENT DOCUMENTS

CN    103343439 A    10/2013
CN    112376206 A    2/2021
(Continued)

OTHER PUBLICATIONS

Machine Translation of Jin et al., CN 103343439 A, Oct. 2013. (Year: 2013).*
(Continued)

*Primary Examiner* — David G Cormier
(74) *Attorney, Agent, or Firm* — STAAS & HALSEY LLP

(57) ABSTRACT

A washing machine including a tub disposed inside a main body, a drainage pump configured to cause the received water inside the tub to flow to an outside of the washing machine through a drainage passage, a first filter, arrangeable along the drainage passage, to filter out foreign matter equal to or greater than predetermined size from the water, and a second filter, arrangeable along the drainage passage, to filter out foreign matter smaller than the predetermined size from the water. The drainage passage includes a first connecting hose to guide the water to flow from the tub to the first filter, a second connecting hose to guide the water to flow from the first filter to the second filter, and a drainage
(Continued)

hose to guide the water to be discharged from the second filter to the outside of the washing machine.

15 Claims, 22 Drawing Sheets

(51) Int. Cl.
| | |
|---|---|
| B01D 29/56 | (2006.01) |
| B01D 29/60 | (2006.01) |
| B01D 29/64 | (2006.01) |
| B01D 35/147 | (2006.01) |
| B01D 61/14 | (2006.01) |
| B01D 61/18 | (2006.01) |
| B01D 61/22 | (2006.01) |
| D06F 33/42 | (2020.01) |
| D06F 33/43 | (2020.01) |
| D06F 33/47 | (2020.01) |
| D06F 39/10 | (2006.01) |
| D06F 103/16 | (2020.01) |
| D06F 103/18 | (2020.01) |
| D06F 103/42 | (2020.01) |
| D06F 103/44 | (2020.01) |
| D06F 105/08 | (2020.01) |
| D06F 105/58 | (2020.01) |

(52) U.S. Cl.
CPC ....... *B01D 29/608* (2013.01); *B01D 29/6476* (2013.01); *B01D 35/147* (2013.01); *B01D 61/147* (2013.01); *B01D 61/18* (2013.01); *B01D 61/22* (2013.01); *D06F 33/43* (2020.02); *D06F 33/47* (2020.02); *D06F 39/085* (2013.01); *D06F 39/10* (2013.01); *D06F 2103/16* (2020.02); *D06F 2103/18* (2020.02); *D06F 2103/42* (2020.02); *D06F 2103/44* (2020.02); *D06F 2105/08* (2020.02); *D06F 2105/58* (2020.02)

(58) Field of Classification Search
CPC .... D06F 39/082; D06F 39/083; D06F 39/085; D06F 39/10; D06F 2103/16; D06F 2103/18; D06F 2103/42; D06F 2105/08; D06F 2105/34; D06F 2105/54; D06F 2105/58; D06F 2105/60
See application file for complete search history.

(56) References Cited

U.S. PATENT DOCUMENTS

| | | | | |
|---|---|---|---|---|
| 2012/0006355 | A1* | 1/2012 | Heidel | A47L 15/4225 134/10 |
| 2014/0298590 | A1 | 10/2014 | Fulmer et al. | |
| 2018/0266037 | A1* | 9/2018 | Lv | D06F 39/10 |

FOREIGN PATENT DOCUMENTS

| | | |
|---|---|---|
| EP | 2723934 | 11/2015 |
| EP | 2941497 | 9/2016 |
| EP | 3712320 A1 * | 9/2020 |
| JP | 6-170079 | 6/1994 |
| JP | 2001-79293 | 3/2001 |
| JP | 2004-305404 | 11/2004 |
| JP | 2009-89947 | 4/2009 |
| JP | 2013-81712 | 5/2013 |
| KR | 1996-0001378 | 1/1996 |
| KR | 1999-012186 | 2/1999 |
| KR | 2000-0014700 | 3/2000 |
| KR | 2000-0062047 | 10/2000 |
| KR | 20-0326888 | 9/2003 |
| KR | 10-0386656 | 10/2003 |
| KR | 10-1332286 | 11/2013 |
| KR | 10-2016-0070643 | 6/2016 |
| KR | 10-2017-0130544 | 11/2017 |
| KR | 10-2019-0015083 | 2/2019 |
| KR | 10-2020-0112697 | 10/2020 |
| KR | 10-2020-0114100 | 10/2020 |
| WO | 2019/017848 | 1/2019 |
| WO | 2019/081013 | 5/2019 |
| WO | 2020/057820 | 3/2020 |
| WO | 2020/088846 | 5/2020 |
| WO | 2020/099147 | 5/2020 |

OTHER PUBLICATIONS

Machine Translation of Bold et al., EP-3712320-A1, Sep. 2020. (Year: 2020).*

International Search Report dated Jun. 16, 2022 in International Patent Application No. PCT/KR2022/002675 (3 pages; 4 pages English translation).

* cited by examiner

DRAINAGE PASSAGE INCLUDING FILTER AND WASHING MACHINE HAVING THE SAME

CROSS-REFERENCE TO RELATED APPLICATION

This application is a continuation application under 35 U.S.C. § 111(a) of International Application No. PCT/KR2022/002675, filed on Feb. 23, 2022, which claims priority under 35 U.S.C. § 119 to Korean Patent Application No. 10-2021-0036901, filed on Mar. 22, 2021 in the Korean Intellectual Property Office, the disclosures of each of which are incorporated herein by reference.

1. FIELD

The present disclosure relates to a drainage passage including a filter and a washing machine having the same, and more particularly, to a filter with an improved structure and a washing machine having the same.

2. BACKGROUND

A washing machine is a household appliance that washes clothes, towels, bedding, and the like. Washing machines may be classified into front-loading washing machines that rotate the drum and cause laundry to repeat rising and falling to wash the laundry and top-loading washing machines that wash laundry using a water flow generated by a pulsator when the drum rotates.

Regardless of the type of washing machine, operations performed by the washing machine may include a washing operation in which detergent water is supplied to the tub containing laundry and the laundry is washed while rotating the drum, a rinsing operation in which rinsing water is supplied to the tub and the drum is rotated to rinse the laundry, and a spin-drying operation in which water is discharged from the tub and the drum is rotated to remove moisture from the laundry.

The water discharged from the tub may be discharged together with foreign matter generated from the laundry. Therefore, the washing machine may include a filter device for filtering the water discharged from the tub.

SUMMARY

Additional aspects of the disclosure will be set forth in part in the description which follows and, in part, will be obvious from the description, or may be learned by practice of the disclosure.

In accordance with one aspect of the present disclosure, a washing machine includes a main body, a tub disposed inside the main body and configured to receive water, a drainage pump configured to cause the received water inside the tub to flow to an outside of the main body through a drainage passage, a first filter to which the water is caused to flow due to the drainage pump, the first filter being provided along the drainage passage and configured to filter out foreign matter equal to or greater than a predetermined size from the water, and a second filter to which the water is caused to flow from the first filter due to the drainage pump the second filter being provided along the drainage passage and configured to filter out foreign matter smaller than the predetermined size from the water, wherein the drainage passage includes a first connecting hose provided to guide the water to flow from the tub to the first filter, a second connecting hose provided to guide the water to flow from the first filter to the second filter, and a drainage hose provided to guide the water to flow from the second filter to the outside of the main body.

The washing machine may further include a bypass passage provided to guide the water to flow to the outside of the main body without passing through the second filter, and the bypass passage may include a bypass hose which is either branched from the second connecting hose and connected to the drainage hose or branched from the drainage hose and connected to the second connecting hose.

The washing machine may further include a bypass device which is provided at a point where the branched bypass hose is connected to the second connecting hose or the drainage hose and which includes a valve configured to control whether the water flows to the bypass hose.

The washing machine may further include a water level measurement sensor configured to measure a water level in the tub and a controller configured to control opening/closing of the valve of the bypass device based on the measured water level, and the controller may, based on the measured water level not changing for a predetermined amount of time, control the bypass device so that the water is discharged to the outside of the washing machine through the bypass passage.

The washing machine may further include a temperature measurement sensor configured to measure a temperature of the water in the tub and a controller configured to control opening/closing of the valve of the bypass device based on the measured temperature, and the controller may, based on the measured temperature of the water being a predetermined temperature or lower, control the bypass device so that the water is discharged to the outside of the washing machine through the bypass passage.

The second filter may include a micro filter which has an inner peripheral surface on which fine foreign matter is adsorbed and a filter cleaner which includes a blade configured to rotate while in close contact with the inner peripheral surface of the micro filter and scrape off the fine foreign matter and which is provided to transfer the fine foreign matter to a collection filter disposed adjacent to the micro filter.

The second filter may further include a housing which includes a micro filter portion forming the inner peripheral surface of the micro filter, a second filter inlet, and a second filter outlet, the micro filter and the collection filter may be inserted into the housing and communicate with each other, and the water introduced through the second filter inlet may flow into the micro filter and then pass through the micro filter portion to be discharged through the second filter outlet.

The blade may include a blade shaft and a screw which is formed in an extending direction of the blade shaft and comes in close contact with the micro filter portion, and the micro filter and the collection filter may be disposed to be parallel to each other in the extending direction of the blade shaft so that the micro filter is closer to the second filter inlet than the collection filter.

The washing machine may further include a blade motor disposed at one side of the housing and connected to the blade shaft to rotate the blade.

The washing machine may further include a revolutions-per-minute (RPM) sensor configured to measure the RPM of the blade motor and a controller configured to control opening/closing of the valve of the bypass device based on the measured RPM, and the controller may, based on the measured RPM being outside a predetermined range, control the bypass device so that the water is discharged to the outside of the washing machine through the bypass passage.

The washing machine may further include a current measurement sensor configured to measure a value of current flowing in the blade motor and a controller configured to control opening/closing of the valve of the bypass device based on the measured value of current, and the controller may, based on the measured value of current being outside a predetermined range, control the bypass device so that the water is discharged to the outside of the washing machine through the bypass passage.

The washing machine may further include a display configured to display an operational state of the washing machine, and the display may be provided to display an error based on the measured water level not changing for a predetermined amount of time after the controller controls the bypass device so that the water is discharged to the outside of the washing machine through the bypass passage.

The washing machine may further include an auxiliary drainage pump connected to the first filter and an auxiliary drainage hose provided to allow the water to flow from the first filter to the outside of the washing machine.

The washing machine may further include a water level measurement sensor configured to measure a water level in the tub and a controller configured to control opening/closing of the valve of the bypass device, and the controller may, based on the water level measured by the water level measurement sensor not changing for a predetermined amount of time, control the auxiliary drainage pump so that the water flows to the outside of the washing machine through the auxiliary drainage hose.

The second connecting hose or the drainage hose may be disposed in a U-shape toward the bottom of the main body so that the water collects in response to a stop of operation of the drainage pump.

A first filter outlet provided in the first filter and through which the water is discharged from the first filter and a second filter inlet provided in the second filter and through which the water is introduced into the second filter may each be connected to one of both ends of the second connecting hose, and the second filter inlet may be provided to be disposed at an upper portion of the first filter outlet.

The washing machine may further include a filter door formed at a position on a front panel of the washing machine that corresponds to the second filter, and the collection filter may be separated to the outside through the filter door in an open state.

In accordance with another aspect of the present disclosure, a washing machine includes a tub disposed inside a main body, a drainage pump configured to discharge water inside the tub to the outside of the washing machine, a first filter into which the water is introduced due to the drainage pump and which is provided to filter large foreign matter from the water, a second filter into which the water that has passed through the first filter is introduced due to the drainage pump and which includes a micro filter provided to filter out fine foreign matter from the water, a screw configured to come in close contact with an inner peripheral surface of the micro filter and rotate to scrape off fine foreign matter adsorbed on the inner peripheral surface, and a driving motor configured to rotate the screw, a first connecting hose provided to allow the water to flow from the tub to the first filter, a second connecting hose provided to allow the water to flow from the first filter to the second filter, a drainage hose provided to allow the water to be discharged from the second filter to the outside of the washing machine, a bypass passage configured to connect the second connecting hose and the drainage hose to allow the water to be discharged to the outside of the washing machine without passing through the second filter, and a controller configured to, through a bypass device provided on the bypass passage, control whether the water flows into the bypass passage.

The bypass passage may include a bypass hose which is either branched from the second connecting hose and connected to the drainage hose or branched from the drainage hose and connected to the second connecting hose, and the bypass device may be provided at a point where the branched bypass hose is connected to the second connecting hose or the drainage hose and may include a valve configured to control whether the water flows inside the bypass hose.

The washing machine may further include a water level measurement sensor configured to measure a water level in the tub, and the controller may be provided to control opening/closing of the valve of the bypass device based on the measured water level and may, in response to the measured water level not changing for a predetermined amount of time, control the bypass device so that the water is discharged to the outside of the washing machine through the bypass passage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
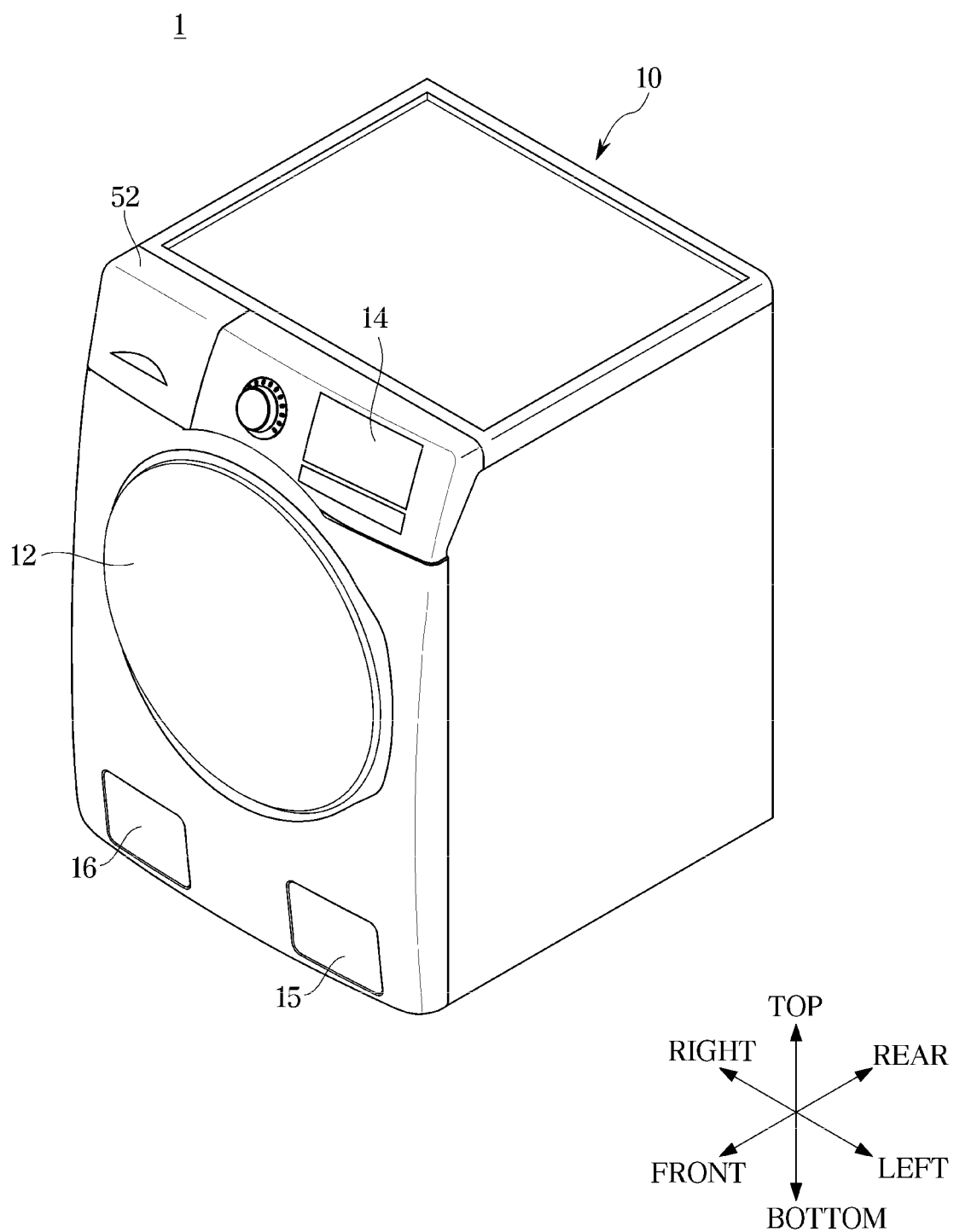
FIG. 1 is a view illustrating a washing machine to which a micro filter is applied according to one embodiment of the present disclosure.

Therefore, it is an aspect of the present disclosure to provide a washing machine having a filter with an improved structure, which is configured to filter microplastics, and a drainage passage.

It is another aspect of the present disclosure to provide a washing machine having an improved drainage passage capable of, even when a filter is blocked in a process of filtering microplastics, completing washing, rinsing, and spin-drying operations without stopping operation of the washing machine.

Embodiments described herein and configurations illustrated in the drawings are merely exemplary embodiments of the present disclosure, and various modifications which may replace the embodiments and the drawings herein may be present at the time of filing this application.

Like reference numerals or symbols presented in the drawings of the application indicate parts or elements that perform substantially the same functions.

Terms used herein are for describing the embodiments and are not intended to limit and/or restrict the disclosure. A singular expression includes a plural expression unless context clearly indicates otherwise. In the application, terms such as "include" or "have" are for designating that features, number, steps, operations, elements, parts, or combinations thereof are present, and do not preclude the possibility of presence or addition of one or more other features, numbers, steps, operations, elements, parts, or combinations thereof in advance.

Terms including ordinals such as "first" and "second" used herein may be used to describe various elements, but the elements are not limited by the terms. The terms are only used for the purpose of distinguishing one element from another element. For example, a first element may be referred to as a second element while not departing from the scope of the present disclosure, and likewise, a second element may also be referred to as a first element. The term "and/or" includes a combination of a plurality of related items or any one item among the plurality of related items.

Meanwhile, terms such as "front end," "rear end," "upper portion," "lower portion," "upper end," "lower end," "upper surface," and "lower surface," used in the following description are defined on the basis of FIG. 1, and the shape and position of each element are not limited by the terms.

Hereinafter, exemplary embodiments according to the present disclosure will be described in detail with reference to the accompanying drawings.

Figure 2:
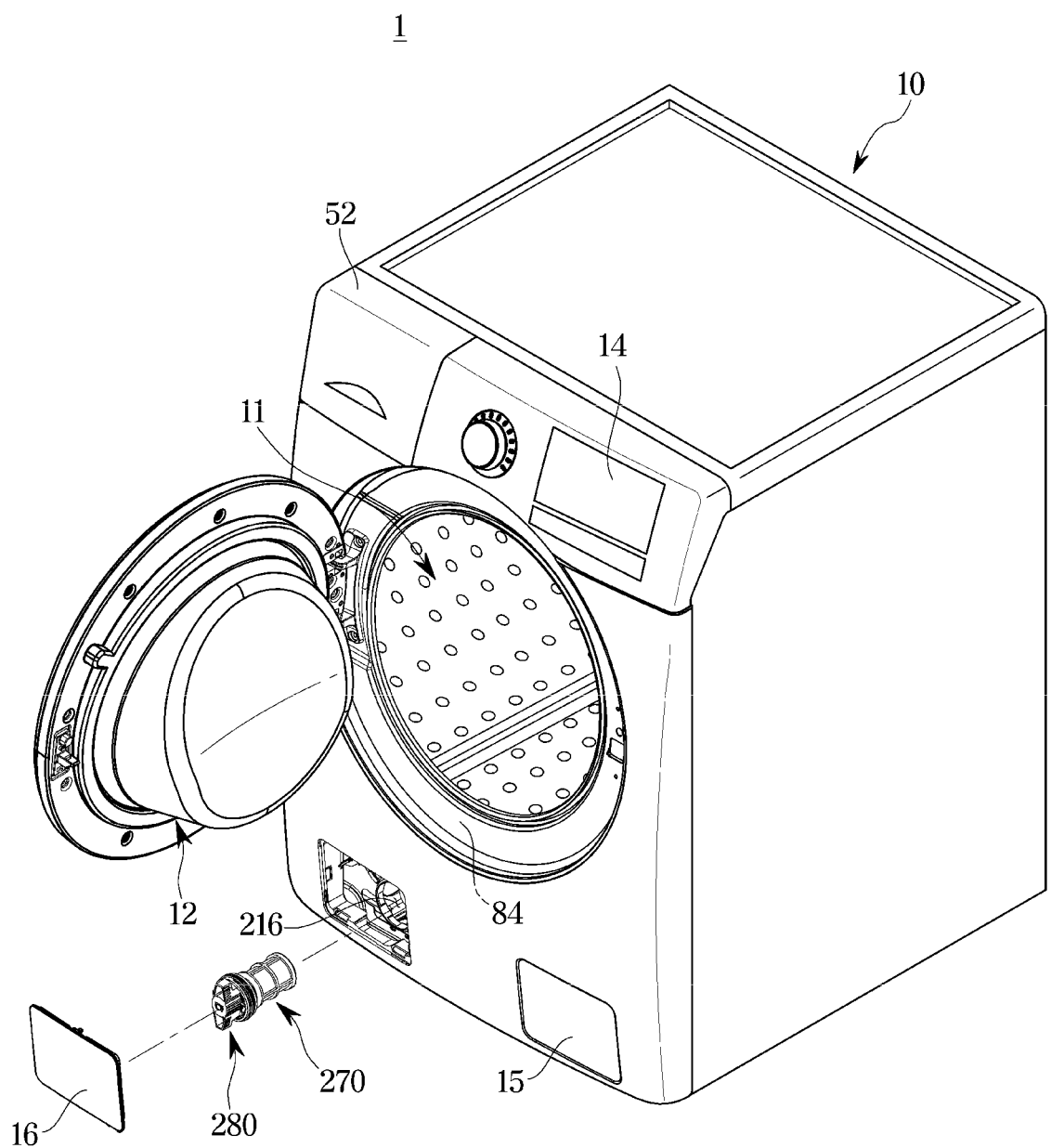
FIG. 2 is a view illustrating a state in which a door of the washing machine of FIG. 1 is open and a state in which a filter door is open and a collection filter of a second filter is withdrawn to the outside of the washing machine.
Figure 3:
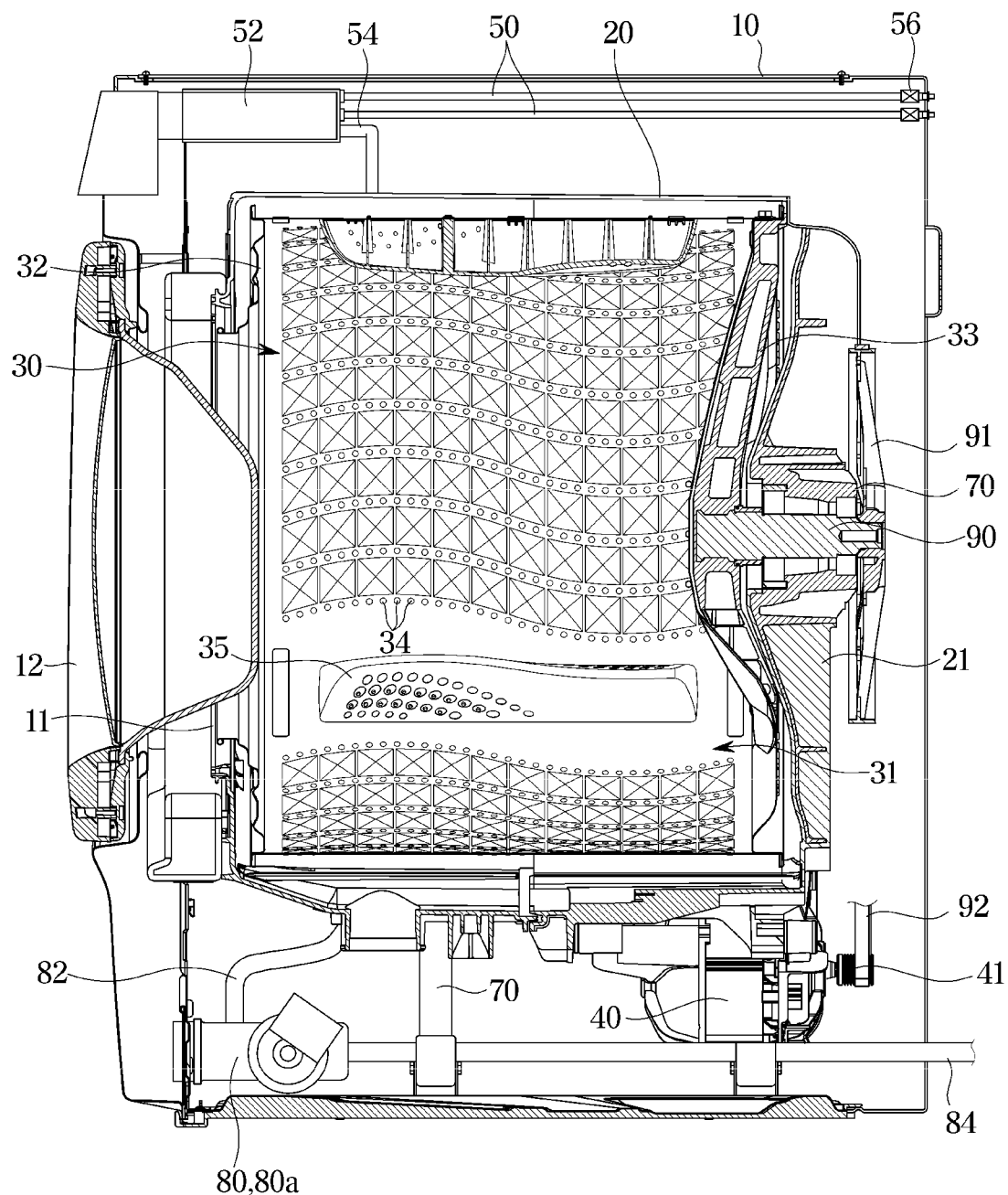
FIG. 3 is a view illustrating a lateral cross-section of the washing machine illustrated in FIG. 1.

FIG. 1 is a view illustrating a washing machine to which a micro filter is applied according to one embodiment of the present disclosure. FIG. 2 is a view illustrating a state in which a door of the washing machine of FIG. 1 is open and a state in which a filter door is open and a collection filter of a second filter is withdrawn to the outside of the washing machine. FIG. 3 is a view illustrating a lateral cross-section of the washing machine illustrated in FIG. 1.

As illustrated in FIGS. 1 and 2, a washing machine 1 includes a cabinet 10 forming an exterior, a tub 20 disposed inside the cabinet 10, a drum 30 rotatably disposed inside the tub 20, and a driving motor 40 configured to drive the drum 30.

An inlet 11 may be formed at a front portion of the cabinet 10 so that laundry may be put inside the drum 30. The inlet 11 is opened and closed by a door 12 installed at the front portion of the cabinet 10.

A water supply tube 50 configured to supply water to the tub 20 is installed at an upper portion of the tub 20. One side of the water supply tube 50 is connected to a water supply valve 56, and the other side of the water supply tube 50 is connected to a detergent drawer 52.

The detergent drawer 52 is connected to the tub 20 through a connecting tube 54. The water supplied through the water supply tube 50 is supplied into the tub 20 together with a detergent via the detergent drawer 52.

The tub 20 is supported by a damper 70. The damper 70 connects an inner bottom surface of the cabinet 10 to an outer surface of the tub 20.

The drum 30 is configured to include a cylindrical portion 31, a front plate 32 disposed in front of the cylindrical portion 31, and a rear plate 33 disposed behind the cylindrical portion 31. An opening for the entry and exit of laundry is formed in the front plate 32, and a shaft 90 configured to transmit power of the driving motor 40 is connected to the rear plate 33.

A plurality of through-holes 34 for distribution of water are formed around a circumference of the drum 30, and a plurality of lifters 35 are installed on an inner peripheral surface of the drum 30 so that rising and falling of the laundry may occur while the drum 30 rotates.

The drum 30 and the driving motor 40 are connected through the shaft 90, and according to the form of connection between the shaft 90 and the driving motor 40, driving types may be classified into a direct driving type in which the shaft 90 is directly connected to the driving motor 40 to rotate the drum 30 and an indirect driving type in which a pulley 91 is connected between the driving motor 40 and the shaft 90 to drive the drum 30.

The washing machine 1 according to one embodiment of the present disclosure may be provided as the indirect driving type, but the present disclosure is not limited thereto, and technical features of the present disclosure may also be applied to the direct driving type.

One end of the shaft 90 is connected to the rear plate 33 of the drum 30, and the other end of the shaft 90 extends to an outer side of a rear side portion 21 of the tub 20. The other end of the shaft 90 may be provided to be inserted into the pulley 91 to obtain driving force from the driving motor 40.

Also, a motor pulley 41 is formed on a rotating shaft of the driving motor 40. A driving belt 92 may be provided between the motor pulley 41 and the pulley 91, and the shaft 90 may be driven by the driving belt 92.

The driving motor 40 may be disposed at one side of a lower side portion of the tub 20, and the driving belt 92 may drive the shaft 90 while rotating clockwise or counterclockwise in the vertical direction of the tub 20.

A bearing housing 22 is installed at the rear side portion 21 of the tub 20 so as to rotatably support the shaft 90. The bearing housing 22 may be made of an aluminum alloy and may be inserted into the rear side portion 21 of the tub 20 during injection molding of the tub 20.

At a lower portion of the tub 20, a drainage pump 80a configured to discharge water inside the tub 20 to the outside of the cabinet 10, a connecting hose 82 configured to connect the tub 20 and the drainage pump 80a so that the water inside the tub 20 may be introduced into the drainage pump 80a, and a drainage hose 84 configured to guide the water pumped by the drainage pump 80a to the outside of the cabinet 10 are provided.

A first filter 100 (see FIG. 4) and a second filter 200 (see FIG. 4) may be provided between the drainage hose 84 and the drainage pump 80a. A drainage hose 84 may connect the drainage pump 80a and the first filter 100. Before the water is discharged by the drainage pump 80a to the outside of the washing machine 1, the first filter 100 and the second filter 200 may filter the water discharged by the drainage pump 80a.

The first filter 100 and the second filter 200 may be disposed at a lower end portion at the front inside the cabinet 10. The first filter 100 (see FIG. 4) and the second filter 200 (see FIG. 4) will be described in detail below.

Referring to FIG. 2, a user may open a filter door 16 formed at a front surface of the cabinet 10 of the washing machine 1 to withdraw a collection filter 270 of the second filter 200 to the outside of the washing machine 1. Although FIG. 2 illustrates a state in which only the collection filter 270 is withdrawn, as will be described below, a micro filter 250 (see FIG. 6) may also be separated from a housing 210 of the second filter 200 and withdrawn to the outside of the washing machine 1.

Also, the first filter 100 (see FIG. 4) may be provided to have a structure similar to that of the second filter 200. The user may open a filter door 15 formed at the front surface of the cabinet 10 of the washing machine 1 to withdraw a foreign matter filter (not illustrated) of the first filter 100 (see FIG. 4) to the outside of the washing machine 1.

When the amount of foreign matter collected in the collection filter 270 is a certain amount or more, the washing machine 1 may indicate to the user through a display 14 that the collection filter 270 needs cleaning.

The display 14 configured to indicate to the user a state of the washing machine 1 may be provided on an upper portion of the front surface of the cabinet 10. The display 14 may include an input portion. A printed circuit board assembly (not illustrated) may be provided on the upper portion of the front surface of the cabinet 10.

Figure 4:
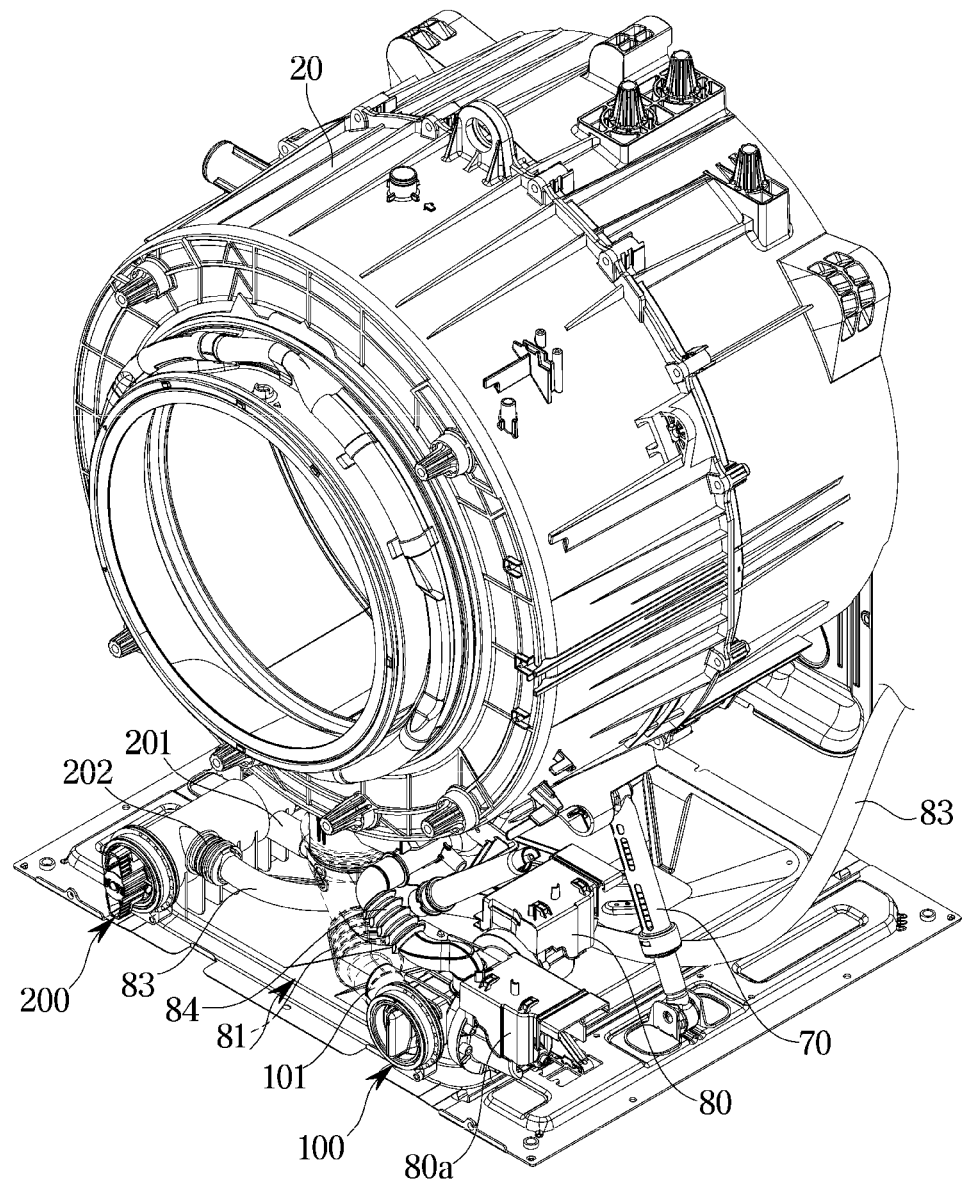
FIG. 4 is a view illustrating a state in which a cabinet is removed from the washing machine illustrated in FIG. 1.

FIG. 4 is a view illustrating a state in which the cabinet is removed from the washing machine illustrated in FIG. 1.

Water that has undergone a washing operation in the tub 20 may contain microplastics, which are contaminants from clothes made of synthetic fibers such as polyester, acrylic, and nylon.

Due to having a very small size, microplastics may be dumped into the ocean without being filtered by sewage treatment facilities. Marine organisms may mistake microplastics containing adsorbent pollutants for food and ingest them, causing disturbances in the marine ecosystem.

Ingestion of microplastics may cause problems such as physical injury, changes in eating habits, and decreased growth and fertility of marine organisms. Because of the food chain, all living things may be exposed to the dangers of microplastics, and microplastics may eventually reach a stage of affecting humans as well.

Therefore, there are needs to filter microplastics discharged from washing machines before the microplastics are introduced into rivers and seas and to allow users to easily collect the microplastics. Hereinafter, a washing machine including a drainage passage and a filter structure which are configured to filter microplastics will be described in detail.

As illustrated in FIG. 4, the washing machine 1 may include the drainage pump 80a configured to forcibly discharge the water of the tub 20 to the outside and a circulation pump 80 provided to circulate the water of the tub 20. The washing machine 1 may further include the first filter 100 configured to communicate with the drainage pump 80a or the circulation pump 80. The washing machine 1 may further include a first connecting hose 81 provided to allow the water inside the tub 20 to flow to the first filter 100 by the drainage pump 80a.

The washing machine 1 may further include a circulation hose 84 provided to allow the water inside the first filter 100 to circulate to the tub 20 again.

The first filter 100 may include a first filter inlet 101 and a first filter outlet 102. The first filter inlet 101 may communicate with the tub 20 through the first connecting hose 81. The drainage pump 80a may force the water of the tub 20 to flow into the first filter 100 through the first filter inlet 101.

One end portion of the first connecting hose 81 may be connected to a bottom surface of the tub 20, and the other end portion thereof may be connected to the first filter inlet 101.

The washing machine 1 may further include a branch tube (not illustrated) branched from the first connecting hose 81. The branch tube (not illustrated) may be connected to the tub 20 and connected to a water level sensor (not illustrated) to measure the amount of washing water inside the tub 20. The water level sensor (not illustrated) may be provided as a pressure sensor.

The first filter 100 may include the foreign matter filter (not illustrated) provided to filter out foreign matter included in the water flowing from the tub 20. The foreign matter filtered out by the foreign matter filter (not illustrated) may be foreign matter having a large volume that may cause a failure or malfunction of the drainage pump 80a upon entering the drainage pump 80a.

The water introduced from the tub 20 into the first filter 100 may be filtered first by the foreign matter filter (not illustrated) by the drainage pump 80a and then discharged through the first filter outlet 102. Alternatively, the water introduced from the tub 20 into the first filter 100 may be filtered first by the foreign matter filter (not illustrated) by the drainage pump 80a and then circulated to the tub 20 again by the circulation pump 80.

The washing machine 1 may further include the second filter 200 configured to secondarily filter the water discharged from the first filter 100. The washing machine 1 may further include the second connecting hose 82 provided to allow the water filtered by the first filter 100 to flow to the second filter 200 by the drainage pump 80a.

The washing machine 1 may further include the drainage hose 83 provided to allow the water filtered by the second filter 200 to be discharged by the drainage pump 80a to the outside of the washing machine 1.

The second filter 200 may include a second filter inlet 201 and a second filter outlet 202. The second filter inlet 201 may communicate with the first filter outlet 102 through the second connecting hose 82. The drainage pump 80a may force the water filtered first by the first filter 100 to flow into the second filter 200 through the second filter inlet 201.

The second filter 200 may include the micro filter 250 provided to filter out foreign matter included in the water flowing from the first filter 100. The foreign matter filtered out by the micro filter 250 may be foreign matter having a small volume such as microplastics.

The water introduced from the first filter 100 into the second filter 200 may be secondarily filtered by the micro filter 250 by the drainage pump 80a and then discharged through the second filter outlet 202.

Figure 5:
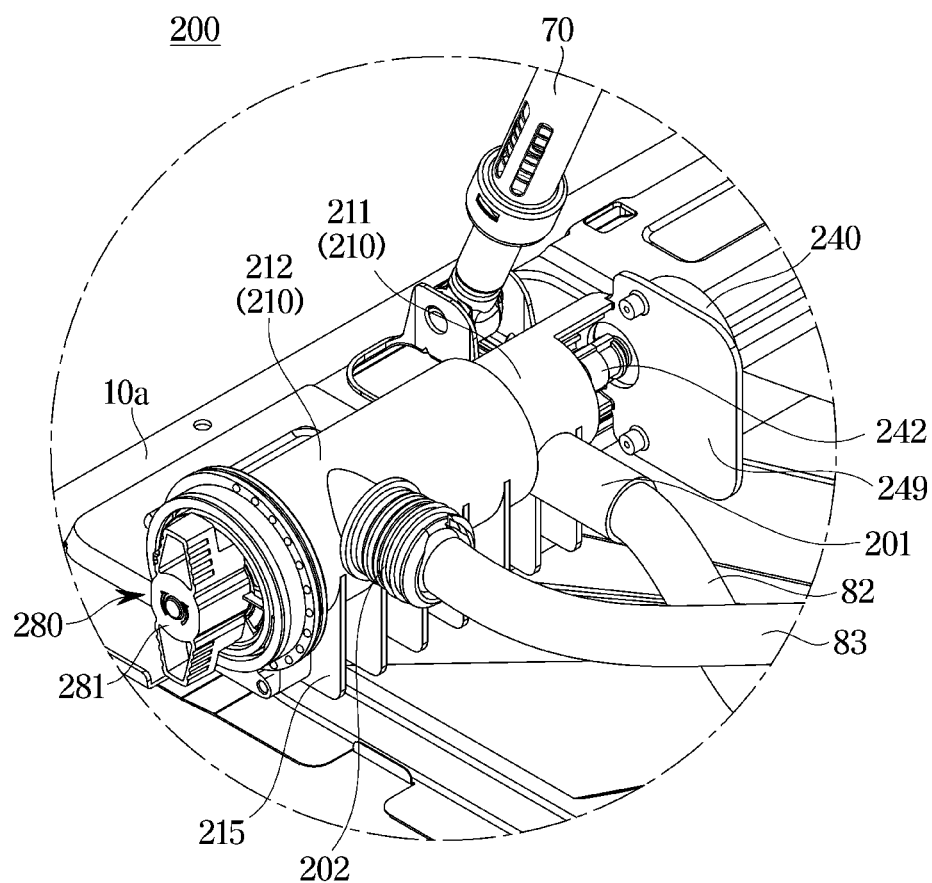
FIG. 5 is an enlarged view of a portion of FIG. 4 where the second filter is disposed.
Figure 6:
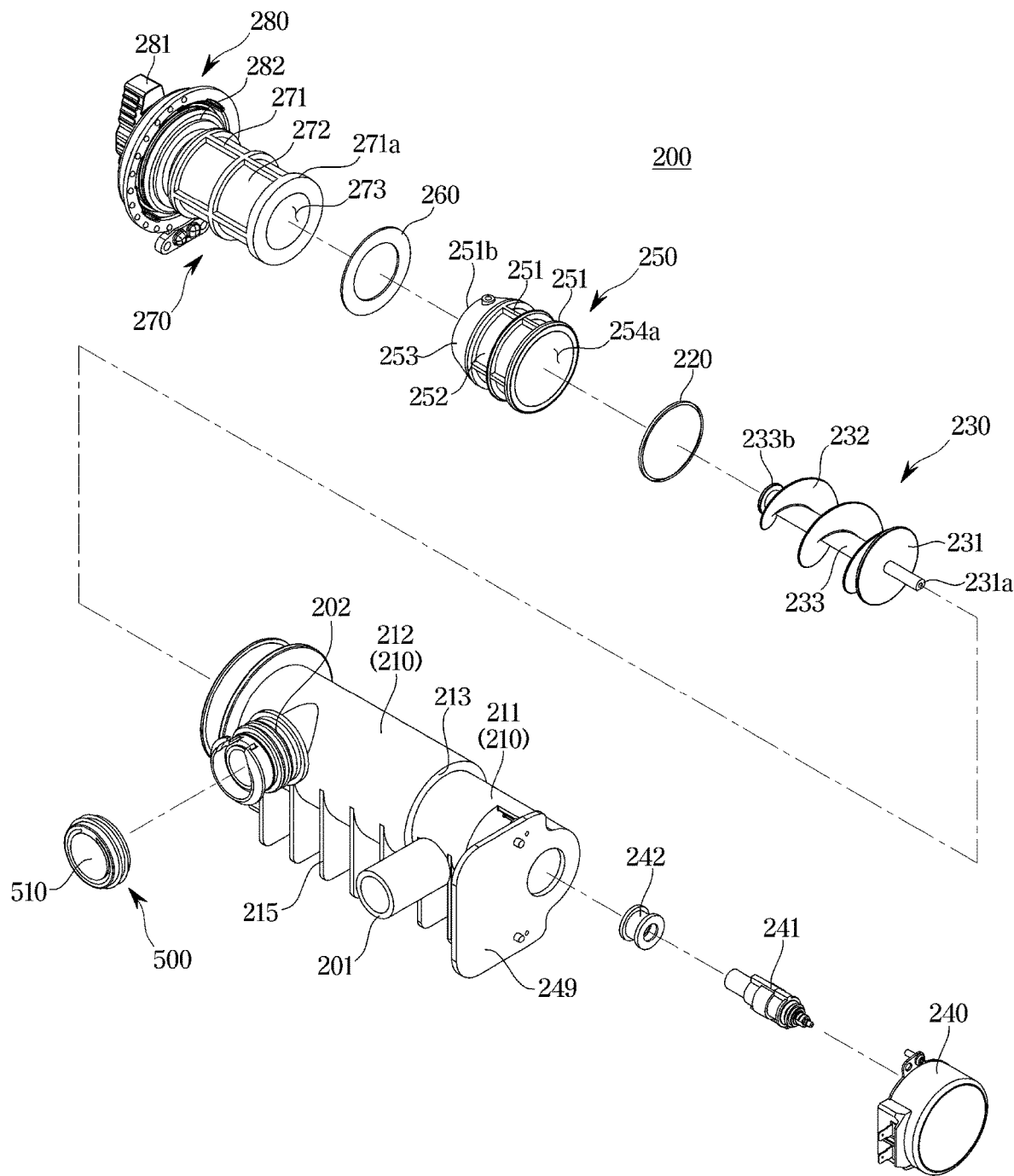
FIG. 6 is an exploded perspective view of the second filter according to one embodiment of the present disclosure.
Figure 7:
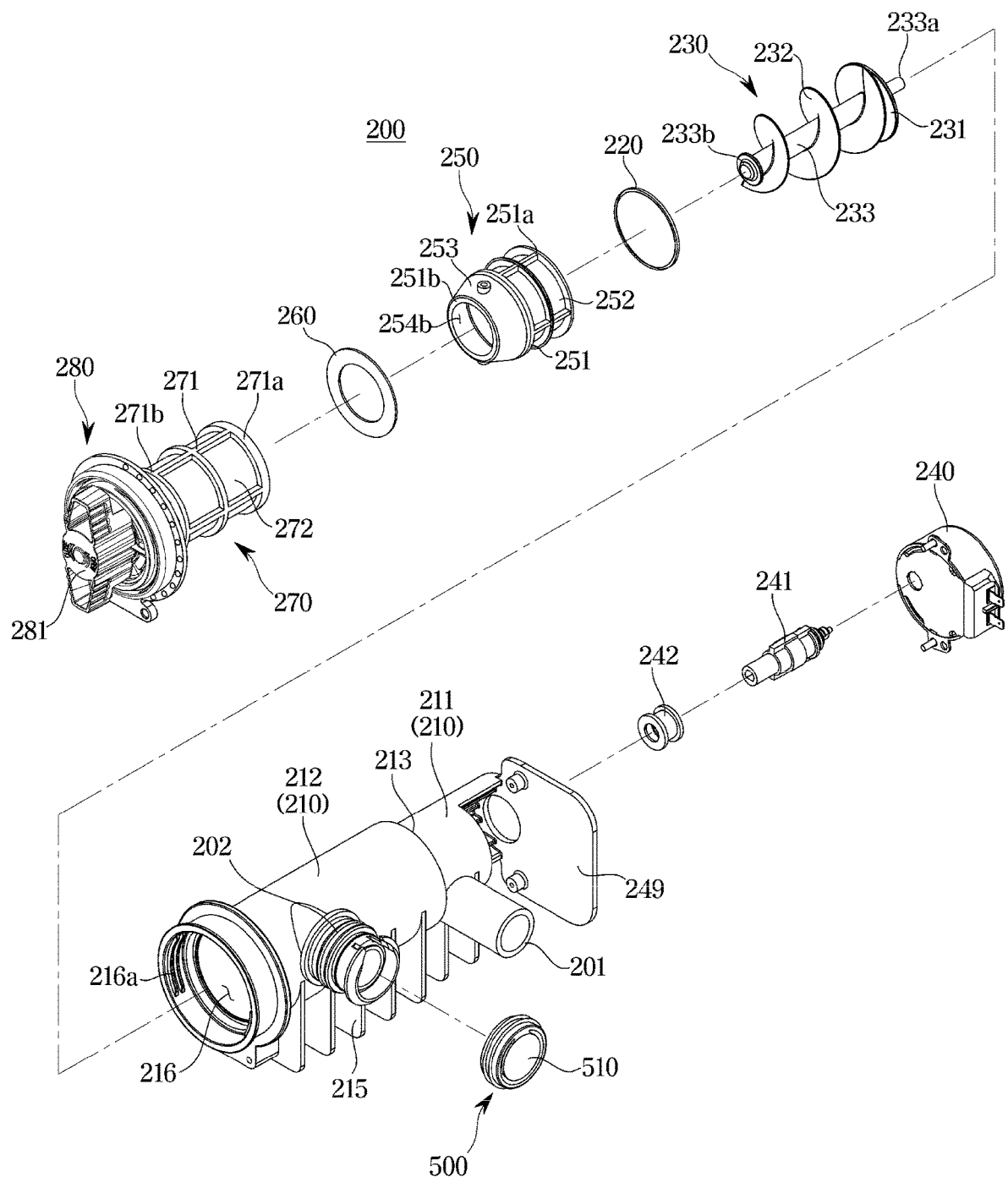
FIG. 7 is a view of FIG. 6 from another direction.
Figure 8:
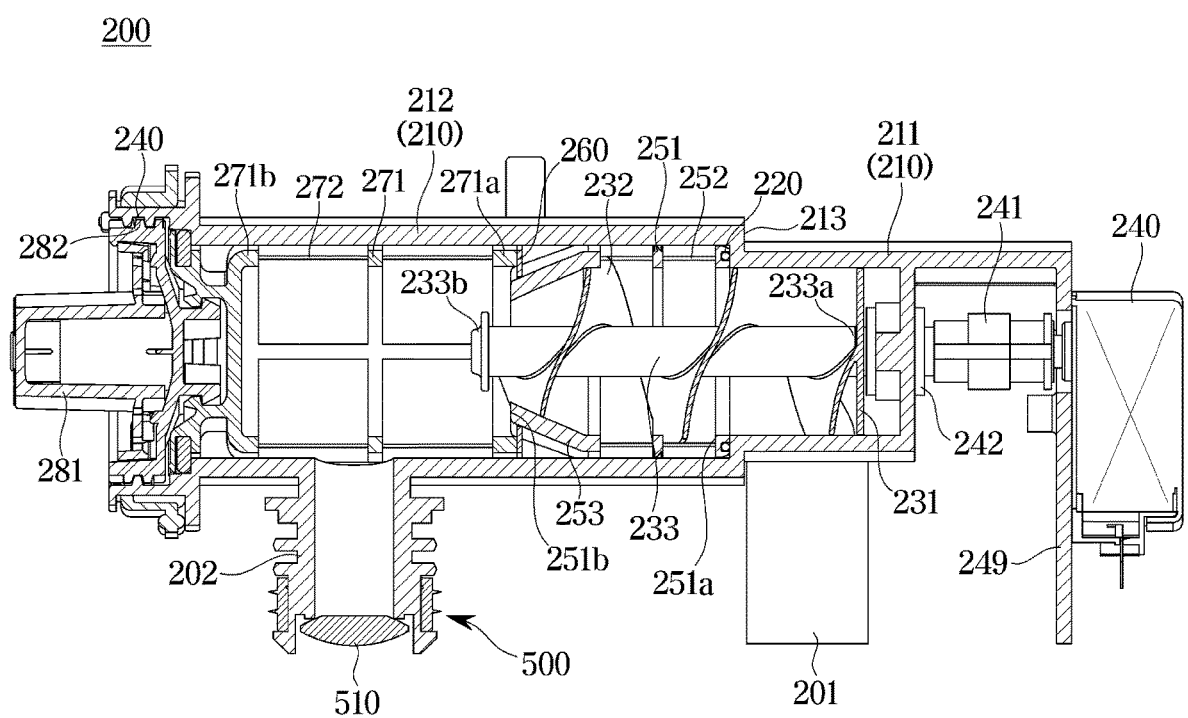
FIG. 8 is as cross-sectional view of the second filter according to one embodiment of the present disclosure.

FIG. 5 is an enlarged view of a portion of FIG. 4 where the second filter is disposed. FIG. 6 is an exploded perspective view of the second filter according to one embodiment of the present disclosure. FIG. 7 is a view of FIG. 6 from another direction. FIG. 8 is as cross-sectional view of the second filter according to one embodiment of the present disclosure.

Hereinafter, the structure of the second filter 200 configured to filter microplastics will be described in detail.

The second filter 200 may include the housing 210 including the second filter inlet 201 and the second filter outlet 202, the micro filter 250 configured to filter microplastics, and the collection filter 270 configured to collect foreign matter transferred from the micro filter 250. The second filter 200 may further include a filter cleaner 230 configured to scrape off foreign matter adsorbed on an inner peripheral surface of the micro filter 250.

The housing 210 of the second filter 200 will be described.

The housing 210 may include a first housing 211 into which water discharged from the first filter 100 by the drainage pump 80a is introduced and a second housing 212 in which the micro filter 250 and the collection filter 270 are seated. The filter cleaner 230 may be seated inside the housing 210 across the first housing 211 and the second housing 212.

The first housing 211 or the second housing 212 may be provided in a substantially cylindrical shape. The first housing 211 and the second housing 212 may be disposed in a state of lying on a cabinet bottom 10a (see FIG. 5). The first housing 211 or the second housing 212 may be disposed to be parallel so that extending directions thereof correspond to each other.

The second filter outlet 202 may be formed in the first housing 211, and the second filter inlet 201 may be formed in the second housing 212. Referring to FIGS. 5 to 8, the second filter outlet 202 or the second filter inlet 201 may be formed in a side surface of the housing 210. The second filter outlet 202 or the second filter inlet 201 may be provided in a substantially cylindrical shape. The second filter outlet 202 or the second filter inlet 201 may protrude from the side surface of the housing 210. The second filter outlet 202 or the second filter inlet 201 may protrude in the same direction from the side surface of the housing 210.

The second filter inlet 201 may be connected to the second connecting hose 82, and the second filter outlet 202 may be connected to the drainage hose 83.

At one side of the second housing 212 that faces the front, an insertion hole 216 may be formed to insert the micro filter 250 and the collection filter 270. The first housing 211 may be disposed at the other side of the second housing 212. That is, the other side of the second housing 212 may face one side of the first housing 211 that faces the front. A hole into which a shaft sealing member 242 is inserted may be formed at the other side of the first housing 211.

The shaft sealing member 242 may be fixed to the hole formed at the other side of the first housing 211. The shaft sealing member 242 may be provided in a substantially cylindrical shape. A hole which corresponds to one end of a coupler 241 may be provided at the center of the shaft sealing member 242. The one end of the coupler 241 may be inserted into the hole formed at the center of the shaft sealing member 242. The shaft sealing member 242 may prevent water inside the housing 210, specifically, the first housing 211, from leaking to the outside of the housing 210 through the hole formed at the other side of the first housing 211.

A diameter of the first housing 211 may be provided to be smaller than a diameter of the second housing 212. The first housing 211 and the second housing 212 may be integrally formed while being stepped from each other. The first housing 211 and the second housing 212 may be disposed to be parallel with respect to the same cylinder axis.

The step formed between the first housing 211 and the second housing 212 may be referred to as a housing step 213. After the micro filter 250 is inserted into the second housing 212, one end of the micro filter 250, specifically, one end 251a of a micro filter body 251, may be supported by the housing step 213.

The second filter 200 may further include a motor mounting portion 249 connected to the other side of the first housing 211 and to which a blade motor 240 is fixed. The motor mounting portion 249 may be provided in the shape of a plate. The other side of the first housing 211 and the motor mounting portion 249 may be spaced apart from each other.

The blade motor 240 may be fixed to one surface of the motor mounting portion 249. A hole which allows one surface and the other surface of the motor mounting portion 249 to communicate may be formed in the motor mounting portion 249. The coupler 241 may be disposed in a space where the motor mounting portion 249 and the other side of the first housing 211 are spaced apart.

The blade motor 240 may be connected to the coupler 241 through the hole allowing communication between the one surface and the other surface of the motor mounting portion 249. The coupler 241 may pass through the shaft sealing member 242 and be connected to one end 231a of a blade shaft 233. A rotating shaft of the blade motor 240, a rotating shaft of the coupler 241, and the blade shaft 233 may be collinear and rotate in the same direction (see FIG. 9).

The second filter 200 may further include a plurality of support ribs 215 configured to support the housing 210 from below the housing 210. The plurality of support ribs 215 may be disposed at predetermined intervals and may protrude from a lower end of the housing 210 toward the cabinet bottom 10a (see FIG. 5). The plurality of support ribs 215 may support the housing 210 while in contact with the cabinet bottom 10a (see FIG. 5).

The filter cleaner 230, the micro filter 250, and the collection filter 270 may be sequentially inserted into the housing 210 through the insertion hole 216 of the housing 210. That is, the filter cleaner 230 may be inserted first, and then the micro filter 250 and the collection filter 270 may be inserted in that order into the housing 210. Hereinafter, according to the order of insertion, the filter cleaner 230, the micro filter 250, and the collection filter 270 will be described.

The filter cleaner 230 may be provided to scrape off foreign matter adsorbed on the inner peripheral surface of the micro filter 250.

The filter cleaner 230 may include a blade 232 configured to scratch the inner peripheral surface of the micro filter 250 and the blade shaft 233 from which the blade 232 extends.

The blade shaft 233 may be provided in a substantially bar-like shape. The blade shaft 233 may be disposed inside the housing 210 while being parallel to the extending direction of the housing 210. The extending direction of the first housing 211, the extending direction of the second housing 212, and the extending direction of the blade shaft 233 may be parallel to each other or coincide with each other.

The blade shaft 233 of the filter cleaner 230 may be disposed across some areas of an inner portion of the first housing 211 and an inner portion of the second housing 212.

The filter cleaner 230 may include the blade 232 extending from the blade shaft 233. The blade 232 may be provided in the shape of a screw. The blade 232 may be made of an elastic material.

The blade 232 may rotate while in close contact with the inner peripheral surface of the micro filter 250. The screw shape of the blade 232 may be formed so that foreign matter dislodged from the inner peripheral surface of the micro filter 250 is able to be transferred toward the collection filter 270.

The filter cleaner 230 may further include a filter plate 231 disposed at an area adjacent to the shaft sealing member 242. The filter plate 231 may be provided in a substantially circular plate-like shape.

The filter plate 231 may extend in a radial direction from the blade shaft 233. The filter plate 231 may be disposed between the shaft sealing member 242 and a point where formation of the screw shape of the blade 232 begins.

A radius of the filter plate 231 may be provided to substantially correspond to an inner diameter of the first housing 211.

Due to the filter plate 231 being disposed in the filter cleaner 230, foreign matter such as hair may be prevented from being tangled in the blade shaft 233 or the shaft sealing member 242. Therefore, a load acting on the blade motor 240 may be reduced.

The micro filter 250 and the collection filter 270 may be formed in a substantially cylindrical shape to correspond to the shape of an inner peripheral surface of the housing 210.

The micro filter 250 may be provided in a cylindrical shape with both open sides. The micro filter 250 may include a micro filter portion 252 configured to filter fine foreign matter such as microplastics and the micro filter body 251 configured to support the micro filter portion 252.

An exterior of the micro filter 250 may be formed by the micro filter body 251. The micro filter body 251 may include a plurality of rings and a plurality of ribs configured to support the rings. The one end 251a of the micro filter body 251 may come in close contact with the housing step 213 while a first sealing member 220 is disposed therebetween.

The micro filter portion 252 may be supported by the micro filter body 251 and provided to filter microplastics from the water introduced into the second filter 200. The micro filter portion 252 may be provided as a microfiltration membrane. The micro filter portion 252 may form the inner peripheral surface of the micro filter 250. The screw-shaped blade 232 may be provided to rotate while in close contact with the inner peripheral surface of the micro filter, that is, the micro filter portion 252.

The micro filter 250 may further include an inclined portion 253 provided in a shape that is tapered toward the collection filter 270. That is, the inclined portion 253 may be provided in a substantially funnel-like shape. The inclined portion 253 may be provided at the other end 251b of the micro filter body 251. The inclined portion 253 may serve to allow foreign matter dislodged from the inner peripheral surface of the micro filter 250 to be stably collected into the collection filter 270.

The other end 233b of the blade shaft 233 may pass through the inclined portion 253 and be disposed at one open side of the micro filter 250. The filter cleaner 230 may be supported first by the inner peripheral surface of the micro filter 250 through the blade 232. The filter cleaner 230 may be supported secondarily by one end of the blade shaft 233 being connected to the coupler 241. Due to such a structure, the filter cleaner 230 may be rotatable about a certain axis of rotation inside the housing 210.

The collection filter 270 may be provided in a cylindrical shape with one open side that faces the micro filter 250. The micro filter 250 and the collection filter 270 may be disposed to be parallel in the extending direction of the blade shaft 233 so that the micro filter 250 is closer to the second filter inlet 201 than the collection filter 270.

The collection filter 270 may be connected to the micro filter 250 while a second sealing member 260 is disposed therebetween. Specifically, the second sealing member 260 may come in close contact with one end 271a of a collection filter body 271, and an inner side of the second sealing member 260 may come in close contact with the inclined portion 253 of the micro filter 250. The second sealing member 260 may prevent leakage of water between the collection filter 270 and the micro filter 250. The second sealing member 260 may be made of an elastic material.

The collection filter 270 may include a collection filter portion 272 configured to collect fine foreign matter, such as microplastics, transferred from the micro filter 250 and a collection filter body 271 configured to support the collection filter portion 272.

The collection filter body 271 may include a plurality of rings and a plurality of ribs configured to support the rings. The collection filter portion 272 may be provided as a microfiltration membrane. The collection filter portion 272 mostly serves to collect the transferred foreign matter but may also be provided to partially perform the function of filtering microplastics from the water introduced into the second filter 200 like the micro filter portion 252.

The other side of the collection filter 270, that is, the other end 271b of the collection filter body 271, may be connected to a filter lid 280. That is, the collection filter 270 may be provided in a state in which the collection filter 270 is coupled to the filter lid 280.

The filter lid 280 may include a handle 281 and a fastening screw 282. A fastening groove 216a which corresponds to the fastening screw 282 may be formed in the insertion hole 216 of the housing 210. After the collection filter 270 connected to the filter lid 280 is inserted into the housing 210 through the insertion hole 216, the user may, by gripping the handle 281 of the filter lid 280 and rotating the filter lid 280, couple the fastening screw 282 and the fastening groove 216a to each other or release the coupling.

When the user opens the filter door 16, the filter lid 280 may be exposed to the outside of the washing machine. The user may open the filter door 16, which is formed at the front surface of the cabinet 10 of the washing machine 1, to withdraw the collection filter 270 of the second filter 200 to the outside of the washing machine 1 (see FIG. 2). The user may, in a state in which the coupling between the fastening screw 282 and the fastening groove 216a is released, pull the handle 281 of the filter lid 280 to withdraw the collection filter 270 of the second filter 200 to the outside of the washing machine 1.

The second filter 200 may further include a check valve 500 coupled to the second filter outlet 202. The check valve 500 may include a valve stopper 510. The valve stopper 510 may be opened only when water flows from the second filter 200 toward the drainage hose 83 through the second filter outlet 202.

Therefore, the drainage pump 80a may stop, and a situation in which water flows from the drainage hose 83 to the second filter 200 through the second filter outlet 202 may be prevented.

Figure 9:
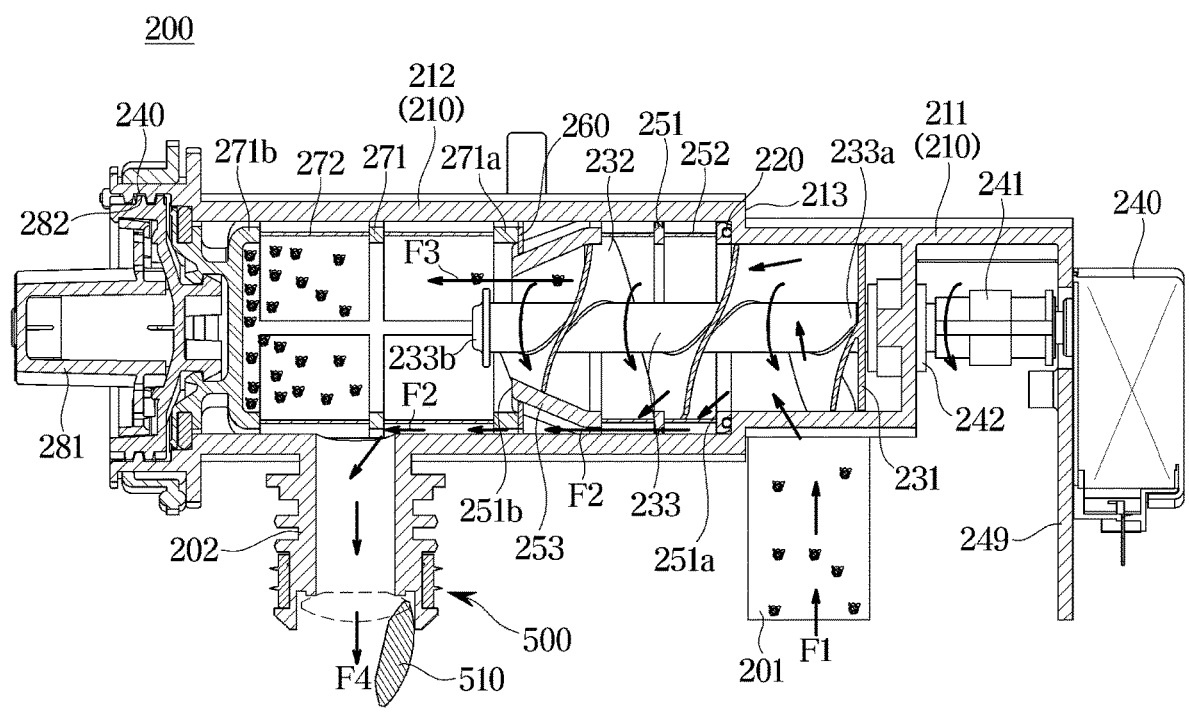
FIG. 9 is a view illustrating a path in which water is filtered and moves and a path in which foreign matter moves inside the second filter according to one embodiment of the present disclosure.

FIG. 9 is a view illustrating a path in which water is filtered and moves and a path in which foreign matter moves inside the second filter according to one embodiment of the present disclosure.

The water introduced into the first housing 211 through the second filter inlet 201 may flow into the micro filter 250. The water introduced into the micro filter 250 may pass through the micro filter portion 252 and flow to a space between the micro filter 250 and the inner peripheral surface of the housing 210. While the water introduced into the micro filter 250 passes through the micro filter portion 252, foreign matter (microplastics) may be adsorbed on the micro filter portion 252 which is the inner peripheral surface of the micro filter 250. The water flowing to the space between the micro filter 250 and the inner peripheral surface of the housing 210 may flow along the inner peripheral surface of the housing 210 and then flow to the drainage hose 83 through the second filter outlet 202. The filtered water may be discharged to the outside of the washing machine through the drainage hose 83.

The blade 232 may rotate while in close contact with the inner peripheral surface of the micro filter 250 to scrape off foreign matter adsorbed on the inner peripheral surface of the micro filter 250. The foreign matter dislodged from the inner peripheral surface of the micro filter 250 may be transferred to the collection filter 270. The transferred foreign matter may be collected inside the collection filter 270. The user may, when a certain amount of foreign matter is collected inside the collection filter 270, withdraw the collection filter 270 to the outside of the washing machine 1 and clean the collection filter 270.

Figure 10:
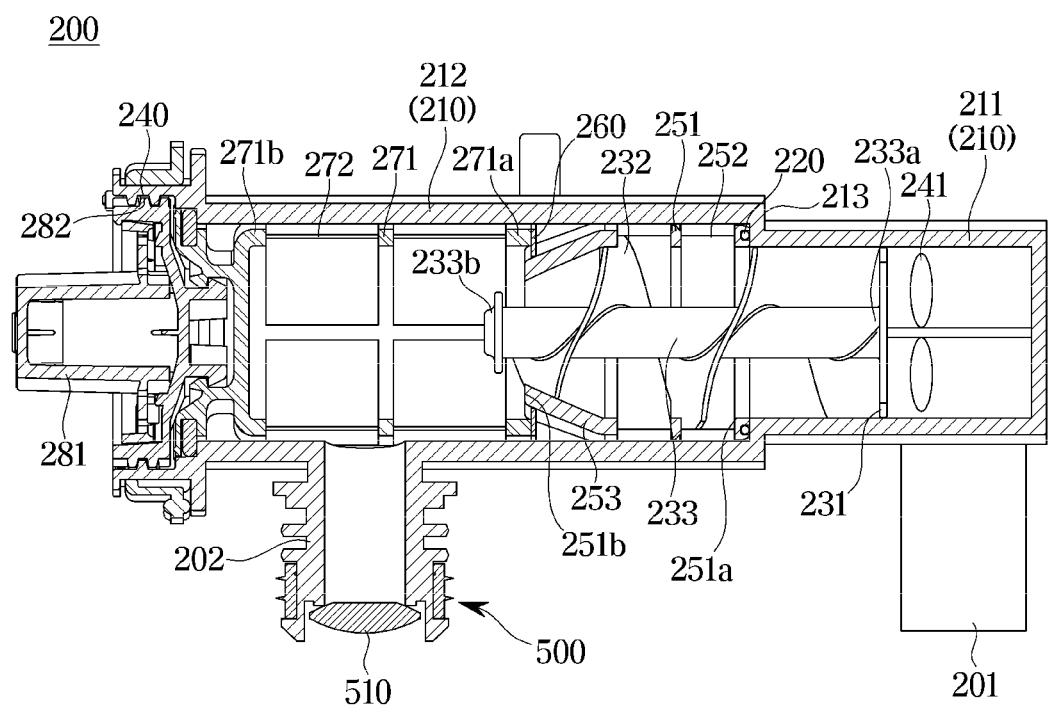
FIG. 10 is a cross-sectional view of a second filter according to another embodiment of the present disclosure.

FIG. 10 is a cross-sectional view of a second filter according to another embodiment of the present disclosure.

A configuration of a second filter 200 according to another embodiment of the present disclosure is mostly similar to the configuration of the second filter 200 according to one embodiment of the present disclosure but is different therefrom in terms of a structure driving the filter cleaner 230.

In the second filter 200 according to one embodiment of the present disclosure, the filter cleaner 230 may be rotated by the blade motor 240 being connected to the blade shaft 233 through the coupler 241.

In the second filter 200 according to another embodiment of the present disclosure, a propeller 241 may be connected to the blade shaft 233. The propeller 241 may be disposed inside the first housing 211. The water flowing through the second filter inlet 201 may rotate the propeller 241 while colliding with the propeller 241. As the propeller 241 rotates, the filter cleaner 230 connected to the propeller 241 may rotate together.

Therefore, the second filter 200 according to another embodiment of the present disclosure may, without a separate driving source such as the blade motor 240, scrape off the foreign matter adsorbed on the inner peripheral surface of the micro filter 250 just by flow energy of the water flowing due to the drainage pump 80a.

Figure 11:
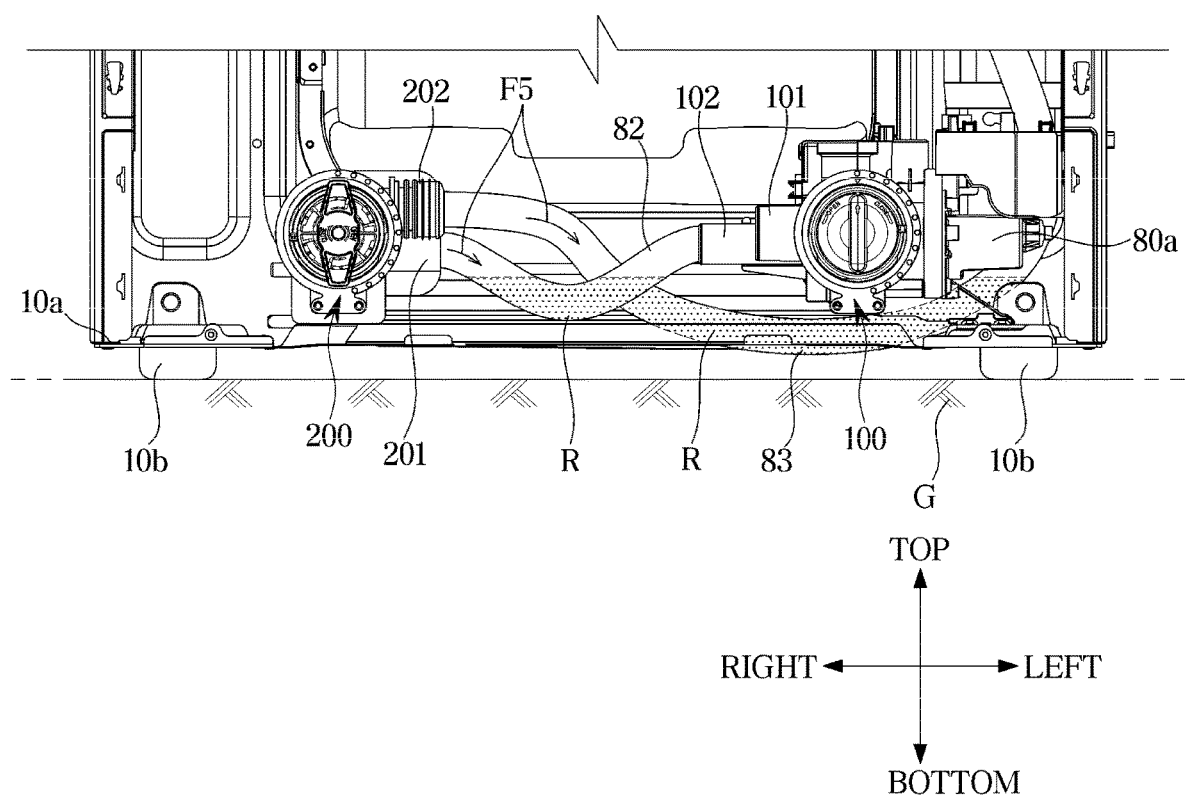
FIG. 11 is a front view of a first filter, a second filter, and a drainage passage of FIG. 4.

FIG. 11 is a front view of the first filter, second filter, and drainage passage of FIG. 4.

The second connecting hose 82 or the drainage hose 83 may be disposed in a U-shape toward the bottom of the washing machine 1. In a state in which the second connecting hose 82 or the drainage hose 83 is disposed in the U-shape, the lowest point inside the hose may be disposed at a position lower than the cabinet bottom 10a. For such a structure, the cabinet bottom 10a may be spaced apart from a ground G by a support member 10b. In response to a stop of operation of the drainage pump 80a, water may collect in a partial area R of the second connecting hose 82 or a partial area R of the drainage hose 83.

Due to the second connecting hose 82 or the drainage hose 83 being provided in the U-shape, an inflow of odor, which may be generated inside the second filter 200, to the outside of the washing machine 1 or to the inside of the tub 20 may be prevented.

Referring to FIG. 11, the first filter outlet 102 and the second filter inlet 201 may be connected to both ends of the second connecting hose 82. The second filter inlet 201 may be provided to be disposed above the first filter outlet 102. Therefore, when the drainage pump 80a does not operate, residual water inside the second filter 200 may easily flow toward the first filter 100.

Therefore, since it is possible to minimize residual water inside the second filter 200, the user may easily clean or replace the collection filter 270 of the second filter 200.

Figure 12:
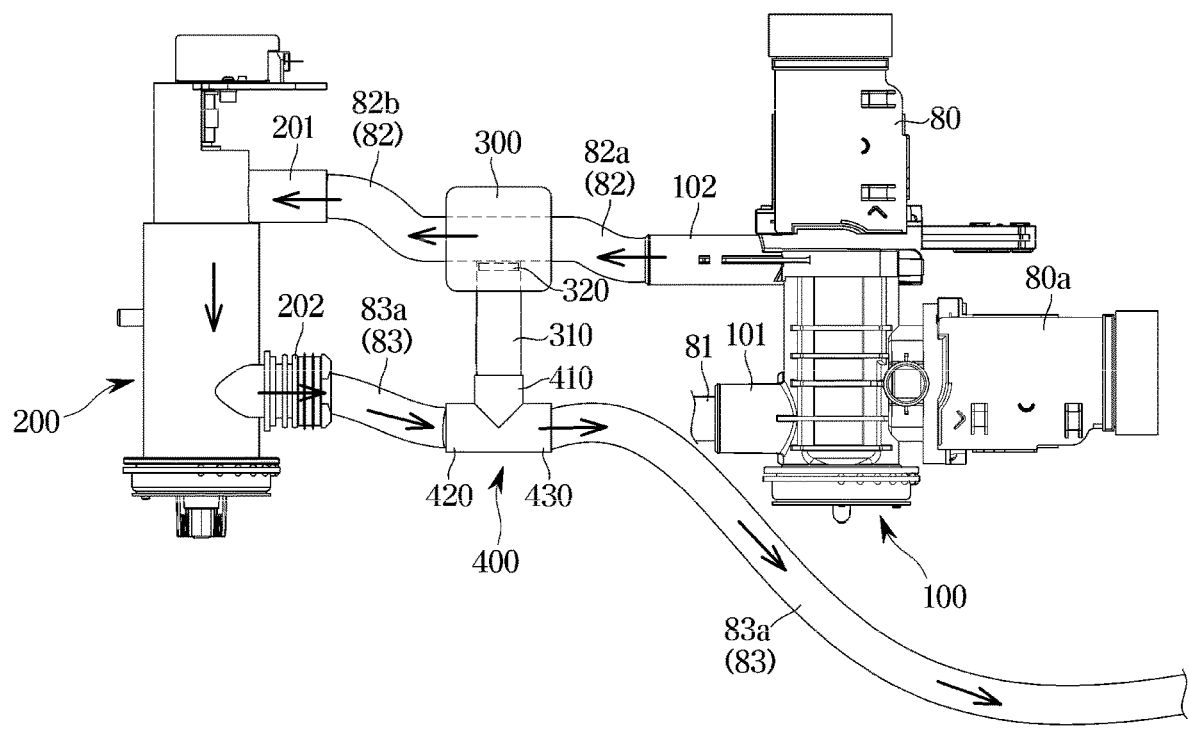
FIG. 12 is a view illustrating a flow of water in a drainage passage according to another embodiment of the present disclosure.
Figure 13:
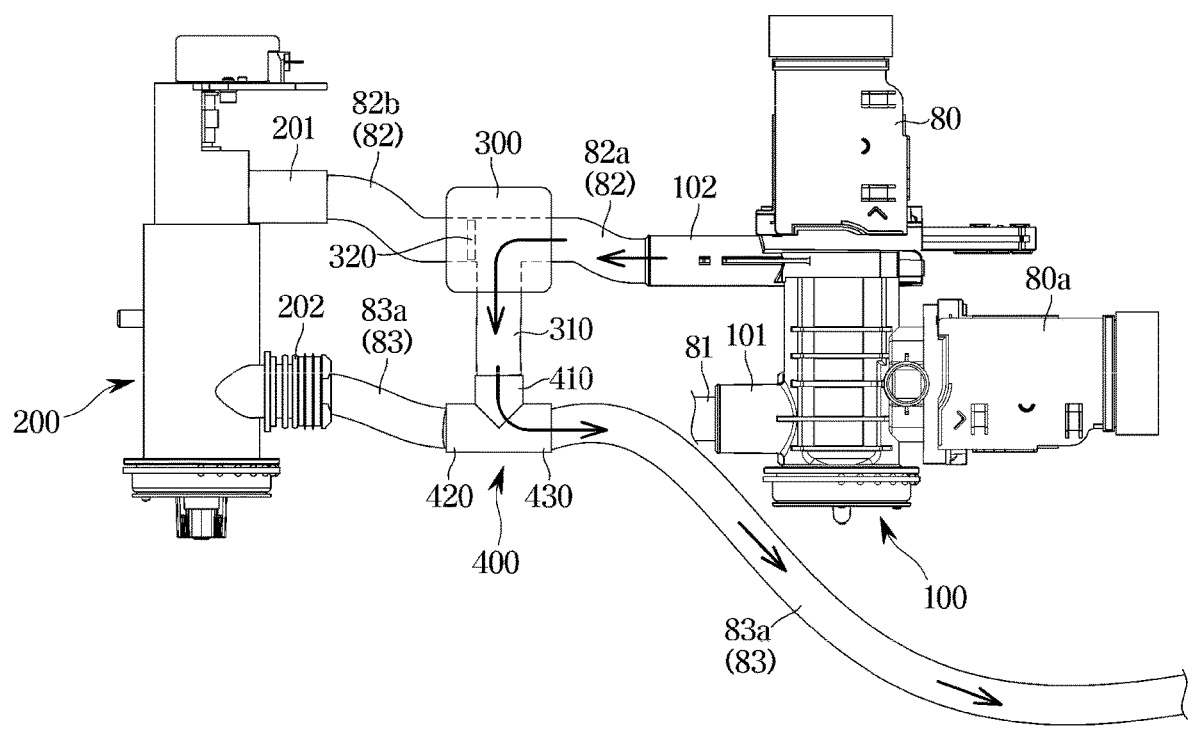
FIG. 13 is a view illustrating a flow of water passing through a bypass passage in FIG. 12.

FIG. 12 is a view illustrating a flow of water in a drainage passage according to another embodiment of the present disclosure. FIG. 13 is a view illustrating a flow of water passing through a bypass passage in FIG. 12.

The washing machine 1 according to one embodiment of the present disclosure may further include a bypass passage provided to allow water to be discharged to the outside of the washing machine 1 without passing through the second filter 200. The bypass passage may include a bypass hose 310 branched from the drainage hose 83 and connected to the second connecting hose 82.

The washing machine 1 according to one embodiment of the present disclosure may further include a bypass device 300 provided at a point where the branched bypass hose 310 is connected to the second connecting hose 82.

The bypass device 300 may include a valve 320 configured to control whether water flows inside the bypass hose 310.

When water flows normally inside the second filter 200, the valve 320 of the bypass device 300 may close a connection hole between the second connecting hose 82 and the bypass hose 310 to allow water to be introduced into the second filter 200 without passing through the bypass hose 310.

When the collection filter 270 of the second filter 200 is completely filled with foreign matter and the foreign matter passes over to the micro filter 250, the foreign matter on the inner peripheral surface of the micro filter 250 may not be removed. Alternatively, when the filter cleaner 230 does not rotate due to foreign matter being tangled in the blade shaft 233 or due to malfunction of the blade motor 240, the foreign matter on the inner peripheral surface of the micro filter 250 may not be removed.

When water does not flow normally inside the second filter 200, the valve 320 of the bypass device 300 may open the connection hole between the second connecting hose 82 and the bypass hose 310 to allow water to immediately flow to the drainage hose 83 through the bypass hose 310 without passing through the second filter 200. This may be referred to as a bypass operation (S160, see FIG. 18).

Due to the bypass operation, even when the second filter 200 is blocked in a process of filtering microplastics, the washing, rinsing, and spin-drying operations may be completed without stopping operation of the washing machine 1.

Figure 14:
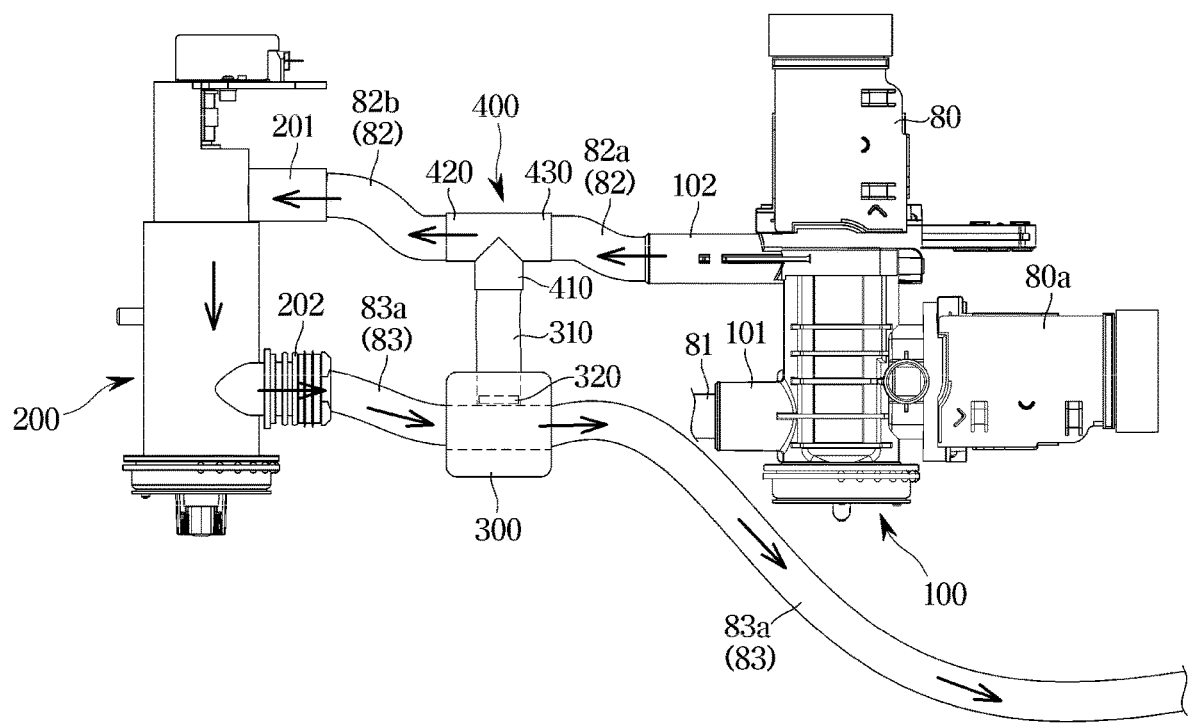
FIG. 14 is a view illustrating a flow of water in a drainage passage according to still another embodiment of the present disclosure.
Figure 15:
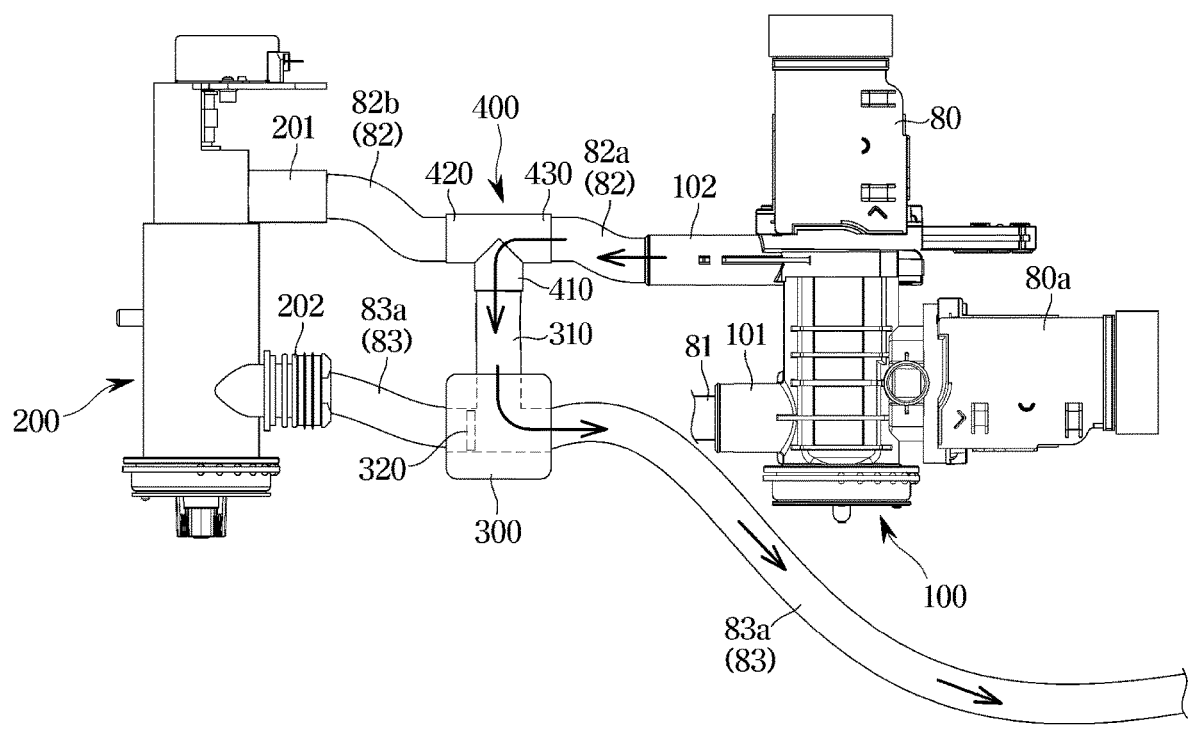
FIG. 15 is a view illustrating a flow of water passing through a bypass passage in FIG. 14.

FIG. 14 is a view illustrating a flow of water in a drainage passage according to still another embodiment of the present disclosure. FIG. 15 is a view illustrating a flow of water passing through a bypass passage in FIG. 14.

The washing machine 1 according to one embodiment of the present disclosure may further include a bypass passage provided to allow water to be discharged to the outside of the washing machine 1 without passing through the second filter 200. The bypass passage may include a bypass hose 310 branched from the second connecting hose 82 and connected to the drainage hose 83.

The washing machine 1 according to one embodiment of the present disclosure may further include a bypass device 300 provided at a point where the branched bypass hose 310 is connected to the drainage hose 83.

The bypass device 300 may include a valve 320 configured to control whether water flows inside the bypass hose 310.

When water flows normally inside the second filter 200, the valve 320 of the bypass device 300 may close a connection hole between the drainage hose 83 and the bypass hose 310 to allow water to be introduced into the second filter 200 without passing through the bypass hose 310.

When the collection filter 270 of the second filter 200 is completely filled with foreign matter and the foreign matter passes over to the micro filter 250, the foreign matter on the inner peripheral surface of the micro filter 250 may not be removed. Alternatively, when the filter cleaner 230 does not rotate due to foreign matter being tangled in the blade shaft 233 or due to malfunction of the blade motor 240, the foreign matter on the inner peripheral surface of the micro filter 250 may not be removed.

When water does not flow normally inside the second filter 200, the valve 320 of the bypass device 300 may open the connection hole between the drainage hose 83 and the bypass hose 310 to allow water to immediately flow to the drainage hose 82 through the bypass hose 310 without passing through the second filter 200. This may be referred to as a bypass operation (S160, see FIG. 18).

Due to the bypass operation, even when the second filter 200 is blocked in a process of filtering microplastics, the washing, rinsing, and spin-drying operations may be completed without stopping operation of the washing machine 1.

Figure 16:
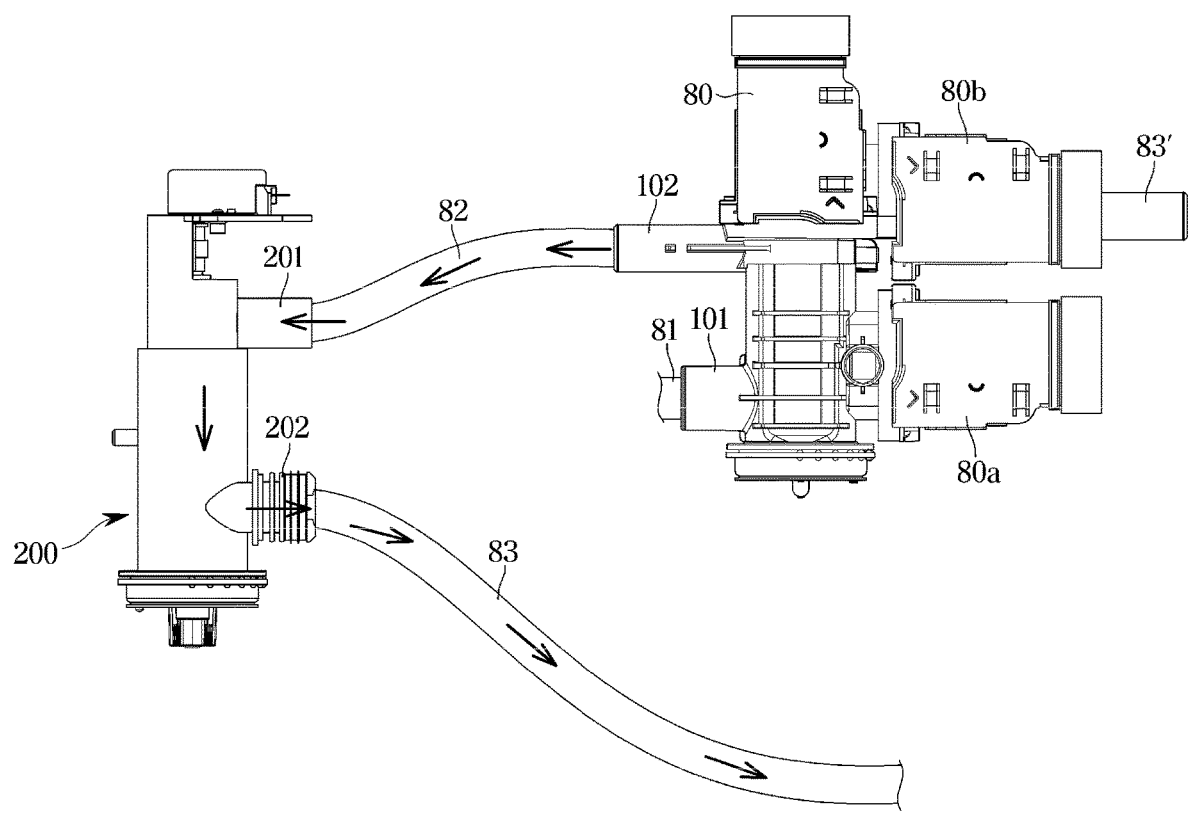
FIG. 16 is a view illustrating a flow of water in a drainage passage according to yet another embodiment of the present disclosure.
Figure 17:
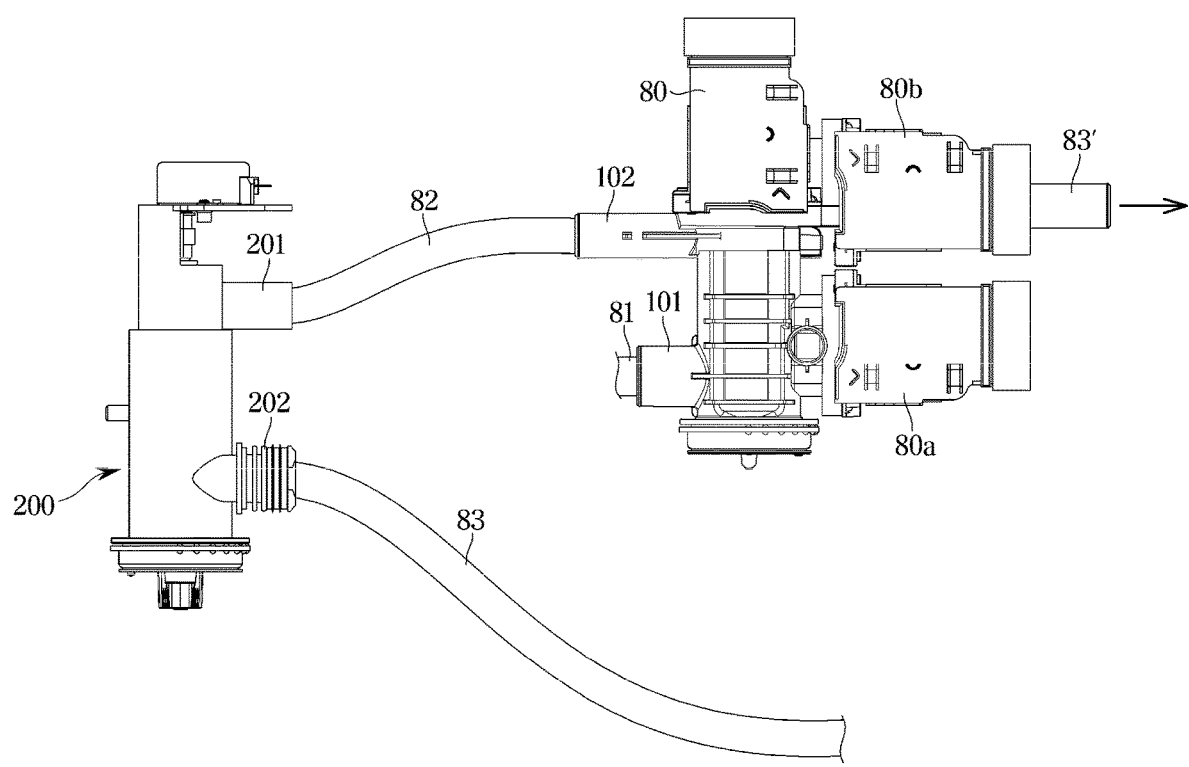
FIG. 17 is a view illustrating a flow of water passing through a bypass passage in FIG. 16.

FIG. 16 is a view illustrating a flow of water in a drainage passage according to yet another embodiment of the present disclosure. FIG. 17 is a view illustrating a flow of water passing through a bypass passage in FIG. 16.

The washing machine 1 according to yet another embodiment of the present disclosure that is disclosed in FIG. 16 may not include the bypass hose 310 configured to connect the second connecting hose 82 and the drainage hose 83.

The washing machine 1 according to yet another embodiment of the present disclosure that is disclosed in FIG. 16 may further include an auxiliary drainage pump 80b separately from the drainage pump 80a.

When water does not flow normally inside the second filter 200, operation of the drainage pump 80a may be stopped. Then, the auxiliary drainage pump 80b may operate. Due to operation of the auxiliary drainage pump 80b, the water inside the tub 20 may be discharged to the outside of the washing machine 1 through an auxiliary drainage hose 83'. This may be referred to as a bypass operation (S160, see FIG. 18).

Due to the bypass operation, even when the second filter 200 is blocked in a process of filtering microplastics, the washing, rinsing, and spin-drying operations may be completed without stopping operation of the washing machine 1.

Figure 18:
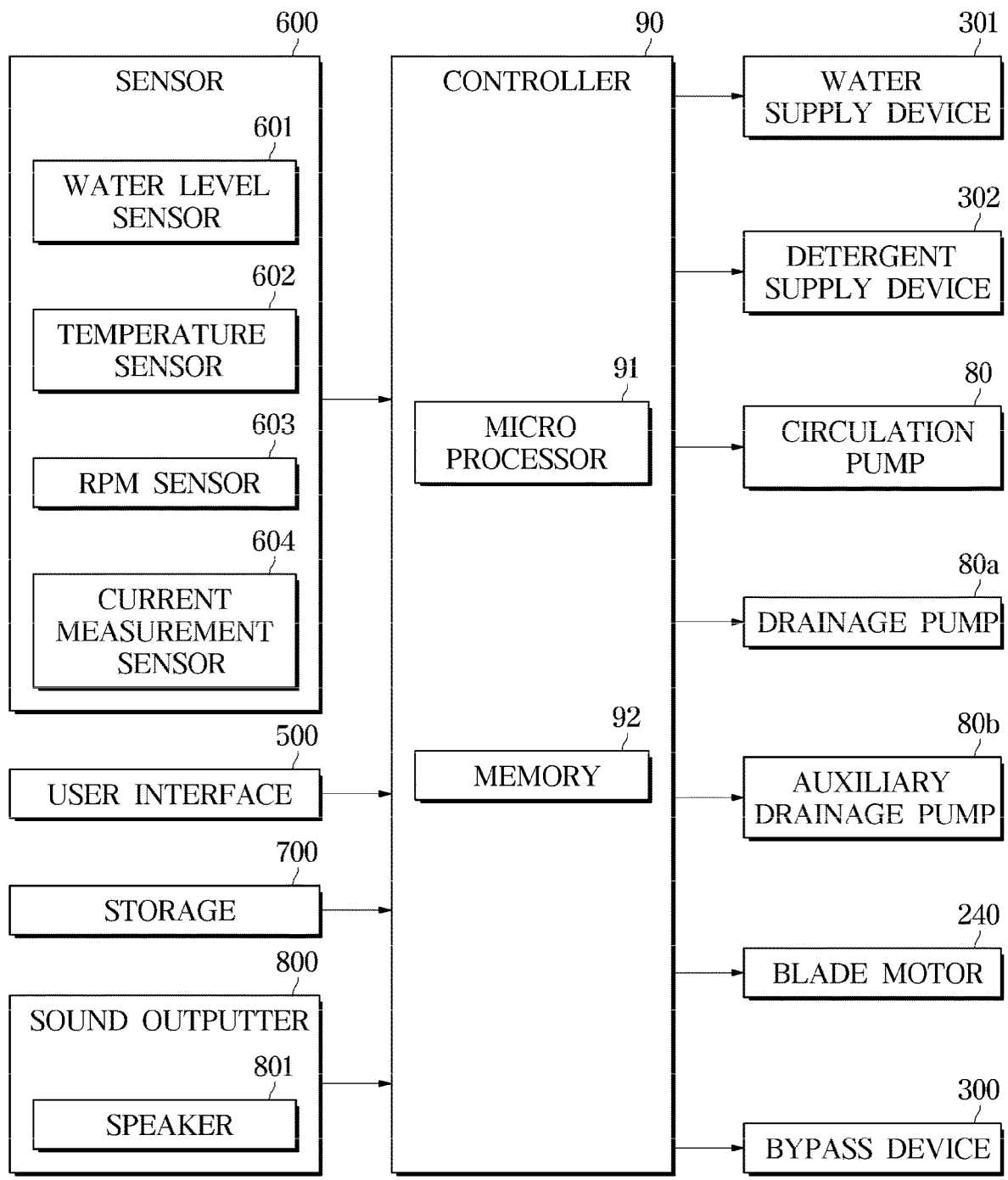
FIG. 18 is a control block diagram for determining a timing of a bypass operation of FIGS. 12 to 17 to control a bypass device and indicating an error.
Figure 19:
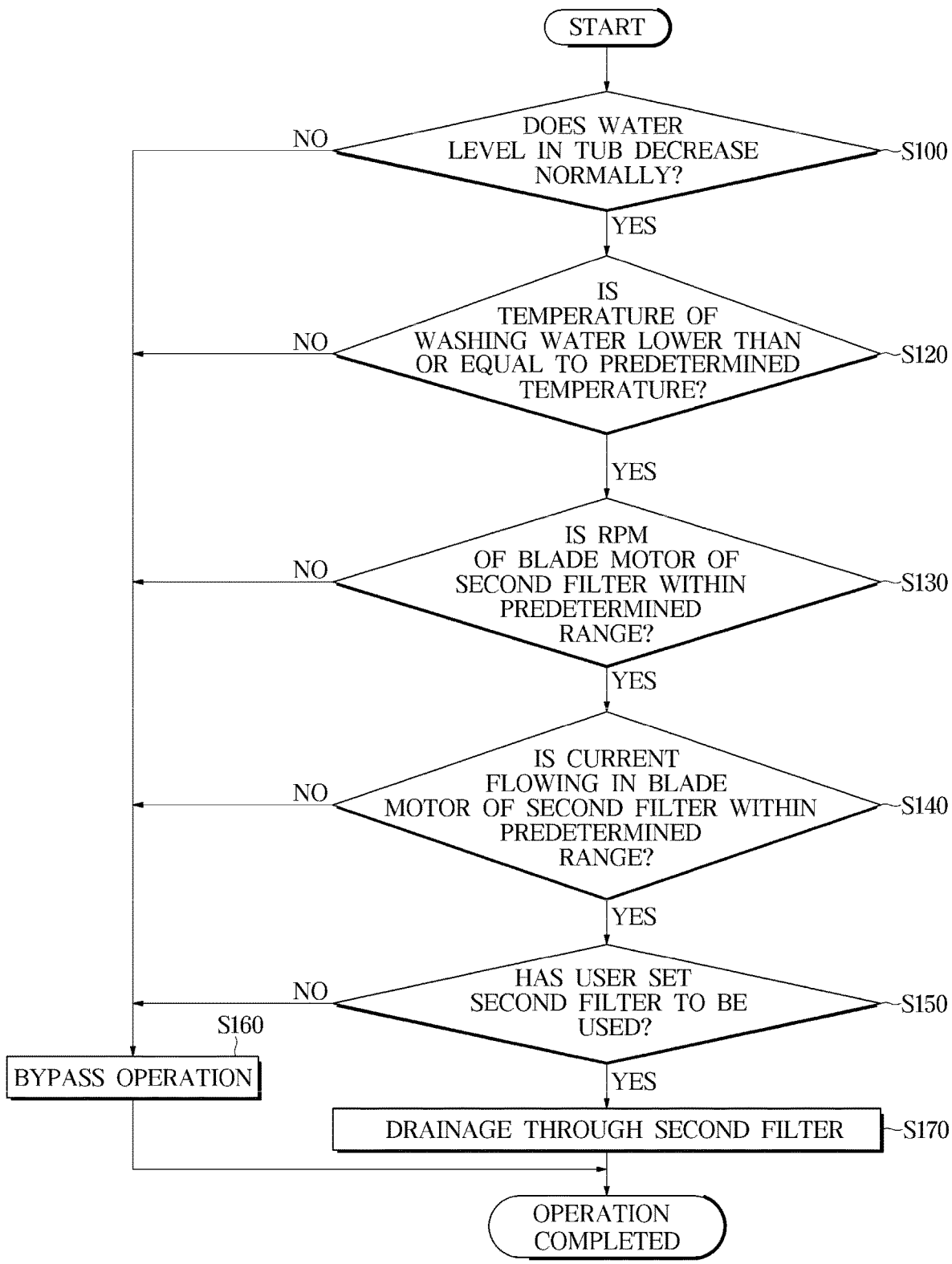
FIG. 19 is a flowchart illustrating a process of one embodiment that is for executing a bypass operation in which water flows through the bypass passage illustrated in FIGS. 13, 15, and 17.
Figure 20:
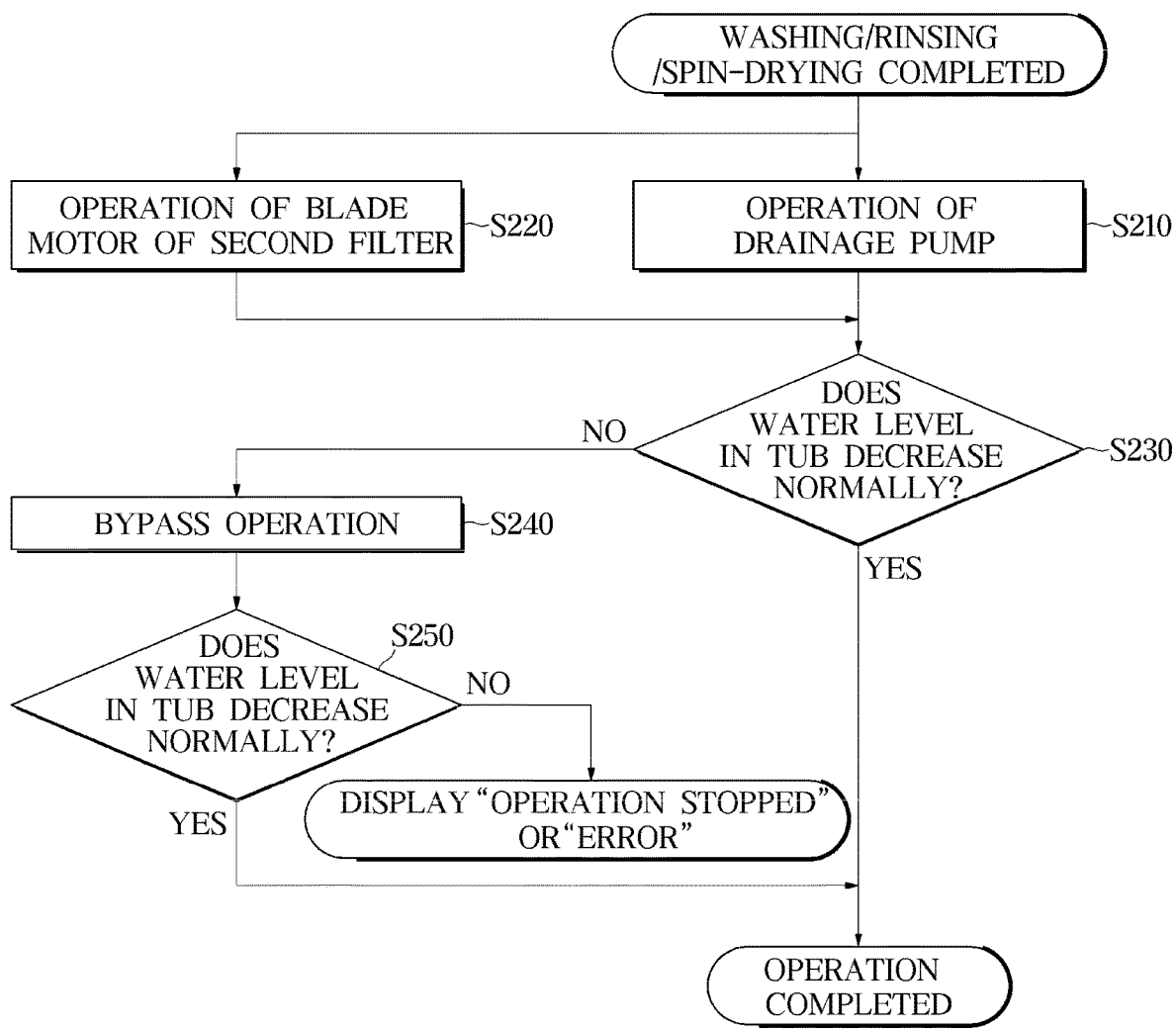
FIG. 20 is a flowchart illustrating a process of one embodiment that is for displaying "operation stopped" or "error" on a display of the washing machine when, despite the bypass operation of FIG. 19, a level of water being drained in a tub does not normally decrease.
Figure 21:
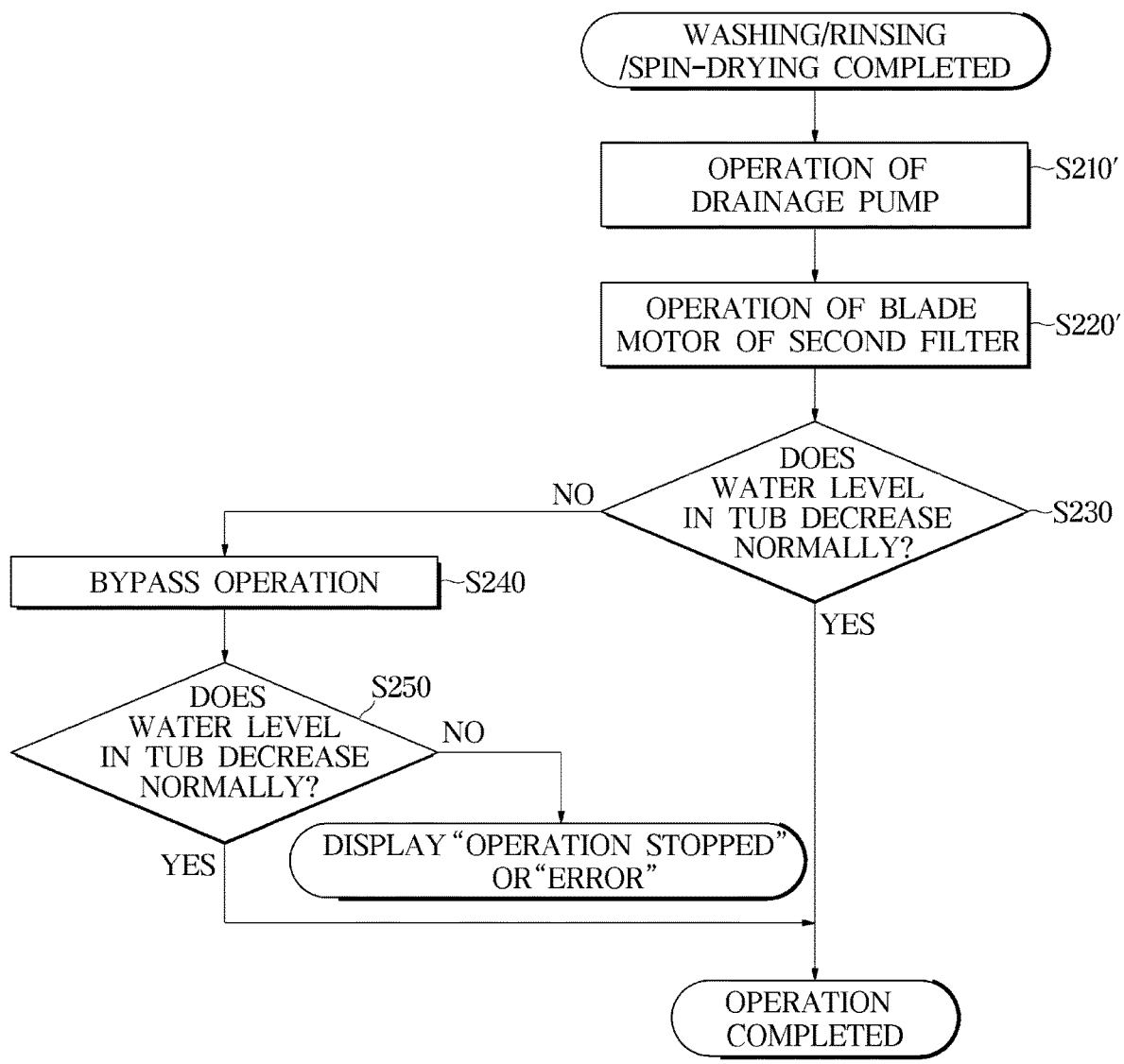
FIG. 21 is a flowchart illustrating a process of another embodiment that is for displaying "operation stopped" or "error" on a display of the washing machine when, despite the bypass operation of FIG. 19, a level of water being drained in a tub does not normally decrease.

FIG. 18 is a control block diagram for determining a timing of the bypass operation of FIGS. 12 to 17 to control a bypass device and indicating an error. FIG. 19 is a flowchart illustrating a process of one embodiment that is for executing a bypass operation in which water flows through the bypass passage illustrated in FIGS. 13, 15, and 17. FIG. 20 is a flowchart illustrating a process of one embodiment that is for displaying "operation stopped" or "error" on a display of the washing machine when, despite the bypass operation of FIG. 19, a level of water being drained in a tub does not normally decrease. FIG. 21 is a flowchart illustrating a process of another embodiment that is for displaying "operation stopped" or "error" om a display of the washing machine when, despite the bypass operation of FIG. 19, a level of water being drained in a tub does not normally decrease.

Referring to FIG. 18, the washing machine 1 according to one embodiment of the present disclosure may further include a user interface 500, a storage 700, a controller 90, a sound outputter 800, and a sensor 600.

The user interface 500 may be interactive with the user. For example, the user interface 500 may receive a user input related to the washing machine 1 from the user and may display the received user input or operational information that corresponds to an operational state.

The user interface 500 may be installed on a front surface of the washing machine 1 for user convenience. The user interface 500 may be installed in a control panel 14. Hereinafter, an example in which the user interface 500 is installed in the control panel 14 will be described, but an installation position of the user interface 500 is not limited thereto. For example, the user interface 500 may be installed at any position that allows the user to manipulate and view the user interface 500.

The controller 90 controls the overall operation of the washing machine 1, such as the washing operation, rinsing operation, and spin-drying operation, according to washing operation information input from the control panel 14. The controller 90 may include a microprocessor 91 and a memory 92.

The storage 700 may store a control program and control data for controlling operation of the washing machine 1 and various application programs and application data for performing various functions according to a user input.

The controller 90 may drive or control the drainage pump 80a, the auxiliary drainage pump 80b, the circulation pump 80, and the bypass device 300. The controller 90 may be a concept that encompasses a driver.

The washing machine 1 according to one embodiment of the present disclosure may further include the sensor 600 configured to allow the controller 90 to determine whether to open or close the valve 320 of the bypass device 300.

The sensor 600 may include a water level sensor 601 configured to measure a water level inside the tub 20. The sensor 600 may further include a temperature sensor 602 configured to measure a temperature of water inside the tub. The sensor 600 may further include a revolutions-per-minute (RPM) sensor 603 configured to measure the RPM of the blade motor 240. The sensor 600 may further include a current measurement sensor 604 configured to measure a value of current flowing in the blade motor 240.

The sensor 600 may transmit measured information to the controller 90.

The controller 90 may, based on the measured information transmitted from the sensor 600, control whether to open or close the valve 320 of the bypass device 300 so that the bypass operation illustrated in FIGS. 13, 14, and 17 is executed.

The sound outputter 800 may include a speaker 801 configured to convert an electrical signal into sound. Here, the sound outputter 800 may receive an electrical sound signal from the controller 90 and output sound that corresponds to the received electrical sound signal.

The washing machine 1 according to one embodiment of the present disclosure may further include the sensor 600 configured to allow the controller 90 to determine whether to open or close the valve 320 of the bypass device 300.

The sensor 600 may include a water level sensor 601 configured to measure a water level inside the tub 20. The sensor 600 may further include a temperature sensor 602 configured to measure temperature of water inside the tub. The sensor 600 may further include a revolutions-per-minute (RPM) sensor 603 configured to measure the RPM of the blade motor 240. The sensor 600 may further include a current measurement sensor 604 configured to measure a value of current flowing in the blade motor 240.

The sensor 600 may transmit measured information to the controller 90.

The controller 90 may, based on the measured information transmitted from the sensor 600, control whether to open or close the valve 320 of the bypass device 300 so that the bypass operation illustrated in FIGS. 13, 14, and 17 is executed.

A process in which the controller 90 determines whether to execute the bypass operation (S160) is as follows.

When the water level inside the tub 20 that is measured by the water level sensor 601 does not change for a predetermined amount of time, the controller 90 may control the bypass device 300, that is, execute the bypass operation (S160), so that water is immediately discharged to the outside of the washing machine 1 through the bypass passage without passing through the second filter 200 (S100).

When the water temperature measured by the temperature sensor 602 is a predetermined temperature or lower, the controller 90 may control the bypass device 300, that is, execute the bypass operation (S160), so that water is immediately discharged to the outside of the washing machine 1 through the bypass passage without passing through the second filter 200 (S120).

When the RPM of the blade motor 240 that is measured by the RPM sensor 603 is outside a predetermined range, the controller 90 may control the bypass device 300, that is, execute the bypass operation (S160), so that water is immediately discharged to the outside of the washing machine 1 through the bypass passage without passing through the second filter 200 (S130).

When the value of current flowing in the blade motor 240 that is measured by the current measurement sensor 604 is outside a predetermined range, the controller 90 may control the bypass device 300, that is, execute the bypass operation (S160), so that water is immediately discharged to the outside of the washing machine 1 through the bypass passage without passing through the second filter 200 (S140).

When the water level inside the tub 20 decreases normally, the temperature of water inside the tub 20 is within a predetermined range, the RPM of the blade motor 240 is within a predetermined range, and the value of current flowing in the blade motor 240 is within a predetermined range, the controller 90 may finally check whether the user has set the second filter 200 to be used (S150) and execute drainage through the second filter 200 (S170).

When the user has not set the second filter 200 to be used, the controller 90 may control the bypass device 300, that is, execute the bypass operation (S160), so that water is immediately discharged to the outside of the washing machine 1 through the bypass passage without passing through the second filter 200.

Referring to FIG. 20, an operation (S210) of the drainage pump 80a and an operation (S220) of the blade motor 240 may simultaneously occur. Alternatively, referring to FIG. 21, an operation (S210') of the drainage pump 80a may occur first, and then an operation (S220') of the blade motor 240 may occur. Alternatively, unlike the above, the operation (S220') of the blade motor 240 may occur first, and then the operation (S210') of the drainage pump 80a may occur.

Determining whether the water level decreases (S230) as illustrated in FIGS. 20 and 21 corresponds to the process in which the controller 90 illustrated in FIG. 18 determines whether to execute the bypass operation (S160).

Even after controlling the bypass device 300 so that water is discharged to the outside of the washing machine 1 through the bypass passage, the controller 90 may display "operation stopped" or "error" through the control panel 14 when the water level inside the tub 20 measured by the water level sensor 601 does not change for a predetermined amount of time. The control panel 14 may be configured to visually and/or aurally display, to the user, information indicating that the second filter 200 needs to be cleaned.

Figure 22:
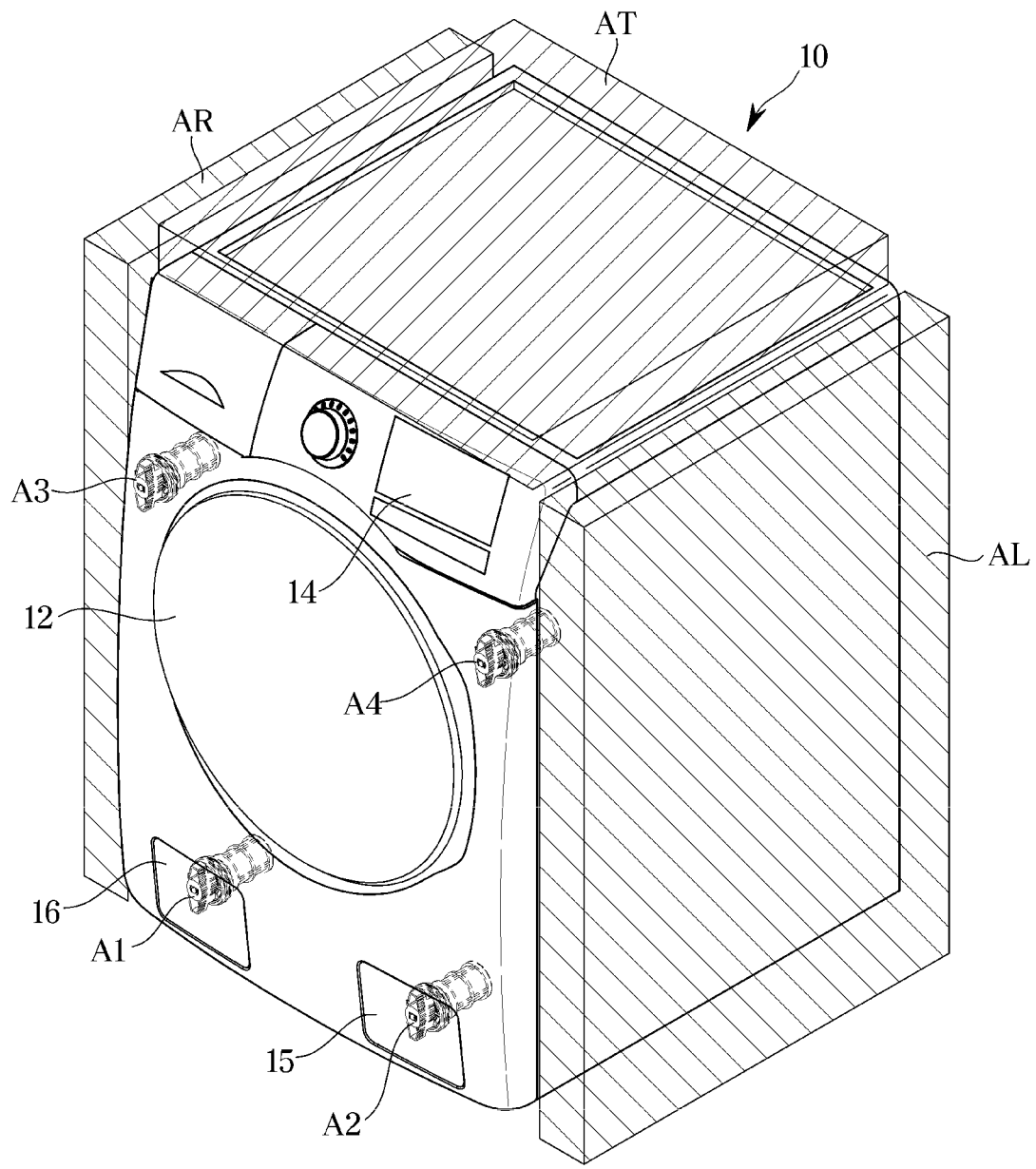
FIG. 22 is a view illustrating an area where a micro filter may be installed in the washing machine according to one embodiment of the present disclosure.

FIG. 22 is a view illustrating an area where the second filter may be installed in the washing machine according to one embodiment of the present disclosure.

Referring to FIG. 22, the second filter 200 may be disposed at a right side A1 (see FIG. 22) at a lower front end inside the cabinet 10.

However, the second filter 200 is not limited thereto and may be installed at a left side A2 at the lower front end, a right side A3 at an upper front end, or a left side A4 at the upper front end. Alternatively, the second filter 200 may be installed at an outer portion of the washing machine 1. That is, the second filter 200 may be installed in a right area AR of the washing machine 1, a left area AL of the washing machine 1, or a top area AT of the washing machine 1.

According to one aspect of the present disclosure, a drainage passage including a filter and a washing machine having the same can apply a plurality of filters between a drainage pump and a drainage hose and effectively remove foreign matter such as microplastics.

According to another aspect of the present disclosure, in a drainage passage including a filter and a washing machine having the same, since a bypass passage is provided between a drainage hose and a hose connected to a filter configured to filter microplastics, even when the filter is blocked in a process of filtering microplastics, washing, rinsing, and spin-drying operations can be completed without stopping operation of the washing machine.

Specific embodiments illustrated in the drawings have been described above. However, the present disclosure is not limited to the embodiments described above, and those of ordinary skill in the art to which the disclosure pertains may make various changes thereto without departing from the gist of the technical spirit of the disclosure defined in the claims below.

What is claimed is:

1. A washing machine comprising:
a main body;
a tub, arrangeable inside the main body, and configured to receive water;
a drainage pump configured so that the water received inside the tub flows to an outside of the main body through a drainage passage;
a first filter, arrangeable along the drainage passage, and configured to filter out foreign matter equal to or greater than a predetermined size from the water which flows through drainage passage; and
a second filter, arrangeable along the drainage passage, and configured to filter out foreign matter smaller than the predetermined size from the water which flows through drainage passage,
wherein the drainage passage includes:
a first connecting hose, connectable to the tub and an inlet of the first filter, to guide the water to flow from the tub to the first filter,
a second connecting hose, connectable to an outlet of the first filter which is positioned lower than an inlet of the second filter, to guide the water to flow from the outlet of the first filter toward the inlet of the second filter and guide the water to flow to the outside of the main body without passing through the second filter, and
a drainage hose, connectable to an outlet of the second filter, to guide the water to flow from the second filter to the outside of the main body and guide the water to flow to the outside of the main body without passing through the second filter.

2. The washing machine of claim 1, further comprising:
a bypass passage to guide the water to flow to the outside of the main body without passing through the second filter,
wherein the bypass passage includes a bypass hose which is either branched from the second connecting hose and connected to the drainage hose or branched from the drainage hose and connected to the second connecting hose.

3. The washing machine of claim 2, further comprising:
a bypass device at a point where the bypass hose is connected to the second connecting hose or the drainage hose, the bypass device including a valve configured to control whether the water flows to the bypass hose.

4. The washing machine of claim 3, further comprising:
a water level sensor configured to measure a water level in the tub; and
a controller configured to control opening/closing of the valve of the bypass device based on the measured water level,
wherein, based on the measured water level not changing for a predetermined amount of time, the controller controls the bypass device so that the water is discharged to the outside of the washing machine through the bypass passage.

5. The washing machine of claim 3, further comprising:
a temperature sensor configured to measure a temperature of the water in the tub; and
a controller configured to control opening/closing of the valve of the bypass device based on the measured temperature,
wherein, based on the measured temperature of the water being a predetermined temperature or lower, the controller controls the bypass device so that the water is discharged to the outside of the washing machine through the bypass passage.

6. The washing machine of claim 1, wherein the second filter includes:
a micro filter which has an inner peripheral surface; and
a filter cleaner including a blade configured to rotate while in close contact with the inner peripheral surface of the micro filter and scrape off the foreign matter smaller than the predetermined size filtered from the water by the second filter, and
a collection filter, adjacent to the micro filter, to receive the foreign matter scraped off by the filter cleaner.

7. The washing machine of claim 6, wherein:
the second filter further includes a housing which includes a micro filter portion forming the inner peripheral surface of the micro filter;
the micro filter and the collection filter are insertable into the housing; and
the water introduced through the inlet of the second filter flows into the micro filter and then passes through the micro filter portion to be discharged through the outlet of the second filter.

8. The washing machine of claim 7, wherein:
the blade includes a blade shaft and a screw along an extending direction of the blade shaft and comes in close contact with the micro filter portion; and
the micro filter and the collection filter are parallel to each other along the extending direction of the blade shaft so that the micro filter is closer to the inlet of the second filter than the collection filter.

9. The washing machine of claim 8, further comprising:
a blade motor at one side of the housing, the blade motor connectable to the blade shaft to rotate the blade.

10. The washing machine of claim 9, further comprising:
a bypass device, connectable to the second connecting hose or the drainage hose, including a valve configured to control whether the water flows to through a bypass passage without passing through the second filter;
a revolutions-per-minute (RPM) sensor configured to measure RPM of the blade motor; and
a controller configured to control opening/closing of the valve of the bypass device based on the measured RPM,
wherein, based on the measured RPM being outside a predetermined range, the controller controls the bypass device so that the water is discharged to the outside of the washing machine through the bypass passage.

11. The washing machine of claim 9, further comprising:
a bypass device, connectable to the second connecting hose or the drainage hose, including a valve configured to control whether the water flows to through a bypass passage without passing through the second filter;
a current measurement sensor configured to measure a value of current flowing in the blade motor; and
a controller configured to control opening/closing of the valve of the bypass device based on the measured value of current,
wherein, based on the measured value of current being outside a predetermined range, the controller controls the bypass device so that the water is discharged to the outside of the washing machine through the bypass passage.

12. The washing machine of claim 4, further comprising a control panel configured to display an operational state of the washing machine,
- wherein the control panel is provided to display an error based on the measured water level not changing for a predetermined amount of time after the controller controls the bypass device so that the water is discharged to the outside of the washing machine through the bypass passage.

13. The washing machine of claim 1, further comprising:
- an auxiliary drainage pump connectable to the first filter; and
- an auxiliary drainage hose to guide the water to flow from the first filter to the outside of the main body.

14. The washing machine of claim 13, further comprising:
- a water level sensor configured to measure a water level in the tub; and
- a controller
- configured to control the auxiliary drainage pump based on the water level measured by the water level sensor not changing for a predetermined amount of time so that the water flows to the outside of the washing machine through the auxiliary drainage hose.

15. The washing machine of claim 1, wherein the second connecting hose or the drainage hose is in a U-shape with curvature toward a bottom of the main body so as to allow the water to flow toward the curvature in response to a stop of operation of the drainage pump.

* * * * *